(12) United States Patent
Ki

(10) Patent No.: US 12,411,634 B2
(45) Date of Patent: Sep. 9, 2025

(54) PARALLEL PROCESSING IN COMPUTATIONAL STORAGE

(71) Applicant: Samsung Electronics Co., Ltd., Suwon-si (KR)

(72) Inventor: Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 146 days.

(21) Appl. No.: 17/856,823

(22) Filed: Jul. 1, 2022

(65) Prior Publication Data
US 2023/0280936 A1 Sep. 7, 2023

Related U.S. Application Data

(60) Provisional application No. 63/316,307, filed on Mar. 3, 2022.

(51) Int. Cl.
*G06F 3/06* (2006.01)

(52) U.S. Cl.
CPC .......... *G06F 3/0656* (2013.01); *G06F 3/0604* (2013.01); *G06F 3/065* (2013.01); *G06F 3/0679* (2013.01)

(58) Field of Classification Search
CPC ...... G06F 3/0656; G06F 3/0604; G06F 3/065; G06F 3/0679; G06F 15/167; G06F 3/0658; G06F 2212/7203
See application file for complete search history.

(56) References Cited

U.S. PATENT DOCUMENTS

| 6,310,898 | B1 | 10/2001 | Schwartz |
| 7,441,224 | B2 | 10/2008 | Bellas et al. |
| 7,631,245 | B2 | 12/2009 | Lasser |
| 7,856,544 | B2 | 12/2010 | Schenfeld et al. |
| 7,873,779 | B2 | 1/2011 | Maddali et al. |

(Continued)

FOREIGN PATENT DOCUMENTS

WO 2020/186081 A1 9/2020

OTHER PUBLICATIONS

EPO Extended European Search Report dated Jul. 18, 2023, issued in corresponding European Patent Application No. 23150952.2 (10 pages).

(Continued)

*Primary Examiner* — Francisco A Grullon
(74) *Attorney, Agent, or Firm* — Lewis Roca Rothgerber Christie LLP

(57) ABSTRACT

A storage device includes a first storage source storing first data. The storage device further includes a second storage source storing second data. The second data includes a first portion and a second portion separated by a delimiter. The storage device further includes a first buffer configured to receive the first data. The storage device further includes a second buffer configured to receive the second data. The storage device further includes a first processor associated with the first buffer. The storage device further includes a second processor associated with the second buffer. The second processor is configured to perform a first operation on the second portion of the second data, and wherein the first processor is configured to perform a second operation on the first data and the first portion of the second data based on the delimiter.

20 Claims, 12 Drawing Sheets

(56) References Cited

U.S. PATENT DOCUMENTS

| | | | |
|---|---|---|---|
| 8,149,622 | B2 | 4/2012 | Lee et al. |
| 8,261,008 | B2 | 9/2012 | Que |
| 8,458,377 | B2 | 6/2013 | Piccirillo et al. |
| 8,478,736 | B2 | 7/2013 | Biran et al. |
| 8,634,247 | B1 | 1/2014 | Sprouse et al. |
| 8,724,381 | B2 | 5/2014 | Burger, Jr. et al. |
| 8,984,369 | B2 | 3/2015 | Varanasi |
| 10,459,661 | B2 | 10/2019 | Shivandand et al. |
| 10,984,044 | B1* | 4/2021 | Batsakis ............... G06F 16/907 |
| 11,061,591 | B2 | 7/2021 | Bae et al. |
| 11,620,336 | B1* | 4/2023 | Batsakis ............... G06F 16/27 707/722 |
| 2008/0046630 | A1 | 2/2008 | Lasser |
| 2014/0236889 | A1* | 8/2014 | Vasan .................. G06F 11/20 707/610 |
| 2016/0036903 | A1* | 2/2016 | Pal ..................... H04L 67/1087 709/213 |
| 2016/0191665 | A1* | 6/2016 | Kang ................. G06F 11/1076 709/205 |
| 2017/0011022 | A1* | 1/2017 | Grossman ............. G06F 16/252 |
| 2018/0089278 | A1* | 3/2018 | Bhattacharjee ......... H04L 43/12 |
| 2018/0121351 | A1 | 5/2018 | Zhang et al. |
| 2018/0341549 | A1* | 11/2018 | Bolkhovitin ........ G06F 11/1068 |
| 2019/0370076 | A1* | 12/2019 | Behar .................... G06F 9/5027 |
| 2020/0174701 | A1* | 6/2020 | Jung ..................... G06F 3/061 |
| 2020/0249839 | A1 | 8/2020 | Yang et al. |
| 2020/0257629 | A1 | 8/2020 | Pinto |
| 2020/0393991 | A1 | 12/2020 | Kachare et al. |
| 2021/0144428 | A1* | 5/2021 | Karazoun ............... G06F 16/48 |
| 2022/0224624 | A1* | 7/2022 | Kasichainula ...... H04L 41/0896 |

OTHER PUBLICATIONS

Wei, et al., "A Hardware-Software Co-design Experiments Platform for NAND Flash Based on Zynq", IEEE Xplore, Library of Congress. Downloaded on Dec. 6, 2021, 7 pgs.

Yoon, et al., Two-Stage In-Storage Processing and Scheduling for Pattern Matching Applications, IEEE Access, https://creativecommons.org/licenses/by/4.0/, Creative Commons Attribution 4.0 License, Received May 27, 2021, accepted Jun. 17, 2021, date of publication Jun. 30, 2021, date of current version Jul. 13, 2021, 14 pgs.

Jeong, et al., "REACT: Scalable and High-Performance Regular Expression Pattern Matching Accelerator for In-Storage Processing", IEEE Transactions on Parallel and Distributed Systems, vol. 31, No. 5, May 2020. pp. 1137-1151.

* cited by examiner

PARALLEL PROCESSING IN COMPUTATIONAL STORAGE

CROSS-REFERENCE TO RELATED APPLICATION(S)

The present application claims priority to and the benefit of U.S. Provisional Application No. 63/316,307, filed Mar. 3, 2022 entitled "PARALLEL PROCESSING OF STREAM DATA IN COMPUTATIONAL STORAGE," the entire contents of all which is incorporated herein by reference.

FIELD

The present disclosure generally relates to systems and methods for parallel processing in computational storage devices.

BACKGROUND

Computational storage devices (CSD) provide computation functions and data storage. Accordingly, a host may store data at a computational storage device. Host data units (e.g., files) may have a different size than CSD data units (e.g., blocks). Accordingly, a host data unit may be split across multiple components of the CSD.

Computations offloaded to the CSD may be targeted to host data units. While, performing the offloaded computations in parallel may decrease total time spent on the computations, it may be difficult for the CSD to provide a parallel execution pipeline due to unknown alignment of the host data units.

The above information disclosed in this background section is only for enhancement of understanding of the background of the disclosure and therefore it may contain information that does not constitute prior art.

SUMMARY

In various embodiments, described herein include systems, methods, and apparatuses related to resource isolation in computational storage devices.

A storage device includes a first storage source storing first data. The storage device further includes a second storage source storing second data. The second data includes a first portion and a second portion separated by a delimiter. The storage device further includes a first buffer configured to receive the first data. The storage device further includes a second buffer configured to receive the second data. The storage device further includes a first processor associated with the first buffer. The storage device further includes a second processor associated with the second buffer. The second processor is configured to perform a first operation on the second portion of the second data, and wherein the first processor is configured to perform a second operation on the first data and the first portion of the second data based on the delimiter.

A method includes receiving, at a first buffer, first data from a first storage source. The method further includes receiving, at a second buffer, second data from a second storage source, the second data including a first portion and a second portion separated by a delimiter. The method further includes performing, at a second processor associated with the second buffer, a first operation on the second portion of the second data. The method further includes performing, at a first processor associated with the first buffer, a second operation on the first data and the first portion of the second data.

A storage device includes a first storage channel including a first media device storing first data. The storage device further includes second storage channel including a second media device storing second data. The second data including a first portion and a second portion separated by a delimiter. The storage device further includes a first compute module associated with the first storage channel and including a first processor and a first input buffer. The storage device further includes a second compute module associated with the second storage channel and including a second processor and a second input buffer. The second processor is configured to perform a first operation on the second portion of the second data. The first processor is configured to perform a second operation on the first data and the first portion of the second data based on the delimiter.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
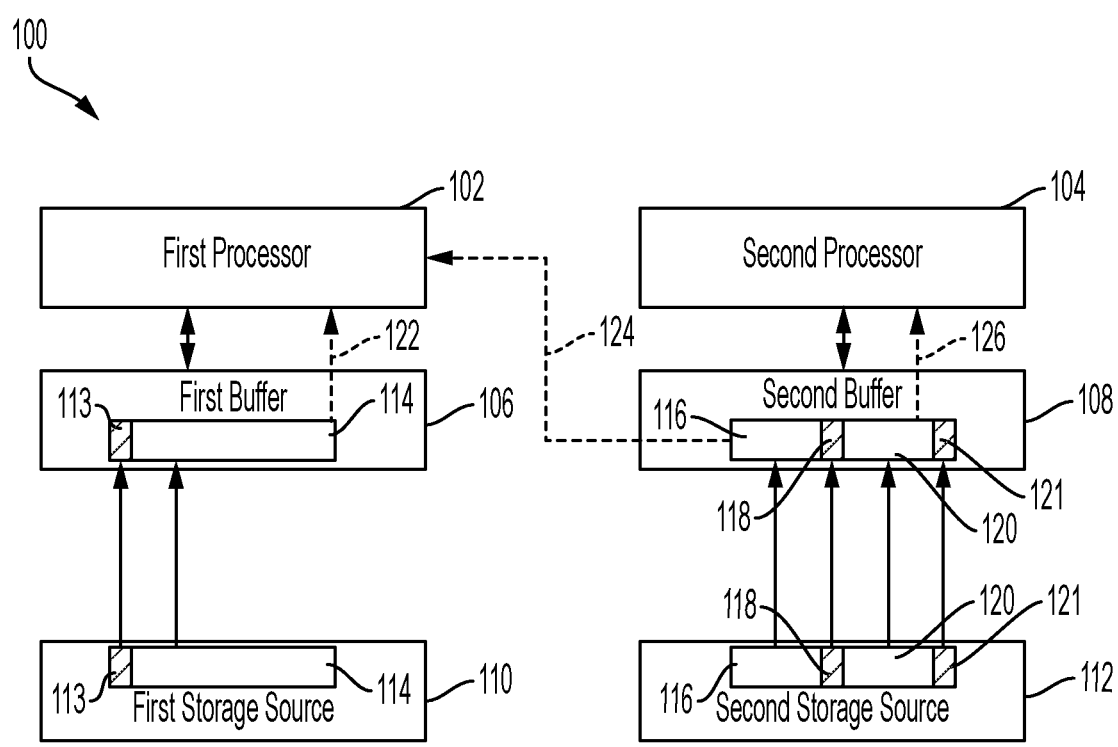
FIG. 1 is a block diagram of a system for parallel processing in computational storage.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As used herein, a computational storage device (CSD) refers to a storage device that supports computational tasks. For example, a CSD may include a storage element (e.g., non-volatile memory, such as flash memory, a hard disk drive, etc.) and a compute element (e.g., a central processor unit (CPU), graphics processor unit (GPU), a field programmable gate array (FPGA), an application specific integrated circuit (ASIC) (such as a tensor processing unit), processor core, etc.) and be configured to support storage of data at the compute element and execution of computational tasks at the compute element. Accordingly, a CSD may provide storage capabilities to a host device (e.g., a computing device) and may support offloading of computational tasks from the host device to the CSD device.

In some examples according to the disclosure, a computational storage device (CSD) includes more than one compute engine and more than one storage source. Examples of media sources include, storage media (e.g., flash chips, such as NAND flash chips, flash media packages, resistive random access memory devices, hard disk devices, etc.) storage channels (e.g., NAND flash channels, etc.), other groupings of storage media, etc. The compute engines receive data from the storage sources and perform computations on the data. Because host data units (e.g., files) operated on by the computations may be split across more than one storage source, the compute engines operate on the data based on locations of delimiters that indicate boundaries between host data units in the data. In particular, a compute engine may begin performing computations on data that follows a first instance of a delimiter in a buffer of the compute engine. Data that precedes the first delimiter may be combined with data from an input buffer of a previous compute engine and processed elsewhere. Similarly, a compute engine may detect a final instance of a delimiter in the input buffer associated with the compute engine and stop computations at the final instance until additional data is available. In some examples, data following the final instance of the delimiter may be carried over to another input buffer to be processed by another compute engine.

The disclosed delimiter aware systems and methods may provide for parallel computations in a CSD despite misalignment between host data units and CSD data units. These systems and methods may be particular useful in RAID configurations in which data is striped across several storage sources. Further, the disclosure may be extended to systems that include host data stored across more than one CSD.

Referring to FIG. 1, a block diagram of a system 100 for parallel processing in computational storage is shown. The system 100 includes a first processor 102, a second processor 104, a first buffer 106, a second buffer 108, a first storage source 110, and a second storage source 112. The first processor 102 may include a central processor unit, a field programmable gate array (FPGA), an application specific integrated circuit (ASIC), a graphics processor unit (GPU), another type of processor, or any combination thereof. The second processor 104 may similarly include any of the types of processor described with respect to the first processor 102. In some implementations the first processor 102, the second processor 104, or both may include a portion of a processor device. For example, the first processor 102 and the second processor 104 may each correspond to 1 or more processor cores.

The first buffer 106 may include a memory device, such as a dynamic random access memory (DRAM), a static random access memory (SRAM), another type of memory, or a combination thereof. The second buffer 108 may similarly include any of the types of memory device described with respect to the first buffer 106. In some implementations, the first buffer 106 and the second buffer 108 correspond to different regions of the same memory device (or virtual memory device).

The first storage source 110 includes one or more storage devices, such as a flash chip (e.g., NAND flash), a flash package, a flash channel (e.g., a NAND flash channel), a hard disk device (HDD), a resistive random access memory (RRAM) device, etc. The second storage source 112 may similarly include any of the types of storage device described with respect to the first storage source 110.

The first processor 102 is associated with the first buffer 106. In some implementations, the first buffer 106 is included within the first processor 102 or the first processor 102 and the first buffer 106 are included in a common compute module. In other implementations, the first processor 102 and first buffer 106 are distinct components of the system 100, and the first processor 102 is configured to utilize the first buffer 106 as an input buffer.

The second processor 104 is associated with the second buffer 108. In some implementations, the second buffer 108 is included within the second processor 104 or the second processor 104 and the second buffer 108 are included in a common compute module. In other implementations, the second processor 104 and second buffer 108 are distinct components of the system 100, and the second processor 104 is configured to utilize the second buffer 108 as an input buffer.

The first storage source 110 and the second storage source 112 may store host data. Because host data units (e.g., files) may not be aligned with storage source data units (e.g., chunks), a host data unit may be split across the first storage source 110 and the second storage source 112. Individual host data units may be separated by delimiters. Accordingly, data occurring between 2 consecutive delimiters may correspond to a single host data unit. Computations to be performed by the first processor 102 and the second processor 104 may be targeted to whole host data units.

In the illustrated example, the first storage source 110 stores first data (e.g., first host data) including a first delimiter 113 and a first portion 114. The second storage source 112 stores second data (e.g., second host data) including a second portion 116, a second delimiter 118, a third portion 120, and a third delimiter 121. The first portion 114 and the second portion 116 may comprise a single host data unit. Accordingly, successful computation based on the single data unit may be based on a processor having access to both the first portion 114 and the second portion 116.

In operation, the first delimiter 113 and the first data 114 are transferred (e.g., copied) from the first storage source 110 into the first buffer 106, and the second portion 116, the second delimiter 118, the third portion 120, and the third delimiter 121 are transferred (e.g., copied) from the second storage source 112 to the second buffer 108. For example, the transfers may correspond to direct memory access (DMA) transfers or some other type of transfers. Transfer of the first delimiter 113 and the first portion 114 may be initiated by the first processor 102. Transfer of the second portion 116, the second delimiter 118, the third portion 120, and the third delimiter 121 of the second data may be initiated by the second processor 104. The first delimiter 113, the first portion 114, the second portion 116, the second delimiter 118, the third portion 120, and the third delimiter 121 may be transferred in response to a request (e.g., from a host device) to perform one or more computations based on host data stored in the first storage source 110 and the second storage source 112. As described above, a computation may target a whole host data unit.

The first processor 102 is configured to identify locations of delimiters in data transferred into the first buffer 106. These delimiters may separate host data units from each other. Similarly, the second processor 104 is configured to identify locations of delimiters in data transferred into the second buffer 108. Based on locations of the delimiters, the first processor 102 determines which data in the first buffer 106 to process. Similarly, the second processor 104 determines which data in the second buffer 108 to process based on locations of delimiters in the second buffer 108. Further, the first processor 102 and/or the second processor 104 may perform computations on data from a different input buffer (e.g., a buffer associated with a different processor) based on locations of delimiters in data of the different input buffer.

For example, the second processor 104 (or the first processor 102) may be configured to ignore data that appears before a first delimiter in the second buffer 108 (or the first buffer 106). Such data may be processed by a different processor. To illustrate, data that appears before the first delimiter may be correspond to an incomplete host data unit. Accordingly, a processor (e.g., the first processor 102) that has the rest of the host data unit may process this data. The first processor 102 may handle data that occurs before a first delimiter in the first buffer similarly.

Further, the second processor 104 may ignore data that appears after a last delimiter in the second buffer 108 (or the first buffer 106). This data that follows the last delimiter may be processed by the second processor 104 in combination with additional data from another input buffer or may be processed in combination with the additional data by a different processor. For example, the second processor 104 may wait until additional data is passed into the second buffer 108 to complete a host data unit following the last delimiter. The first processor 102 may handle data that follows a last delimiter in the first buffer 106.

Data that occurs in between the first and last delimiter in the second buffer 108 may be processed by the second processor 104. Similarly, data that occurs between a first and last delimiter in the first buffer 106 may be processed by the first processor 102. By selectively performing computations based on data in the second buffer 108 according to first and last delimiter locations, the second processor 104 may perform computations on whole host data units.

In the illustrated example, the second processor 104 identifies a location of the second delimiter 118 and a location of the third delimiter 121 in the second buffer 108. Based on the location of the second delimiter 118 (e.g., first delimiter in the second buffer 108), the second processor 104 refrains from processing the second portion 116. "Refraining" from processing the second portion 116 may include beginning to perform computations on data stored at a location in the buffer after the second delimiter 118, transferring (e.g., copying) the second portion 116 to an input buffer of another processor, or a combination thereof.

The second processor 104 performs computations on the third portion 120, as indicated by arrow 126, based on the location of the second delimiter 118 (e.g., the second delimiter 118) and the location of the third delimiter 121. For example, because the third portion 120 falling between a first and last delimiter in the second buffer 108, the second processor 104 may perform a computation on the third portion 120. On the other hand, the first processor 102 performs a computation based on a combination of the first portion 114 and the second portion 116, as indicated by arrows 122 and 124, based on a position of the first delimiter 113 and the second delimiter 118. In some implementations, the second processor 104 transfers the second portions 116 into the first buffer 106. In other implementations, the first buffer 106 and the second buffer 108 are arranged in a continuous memory space and the first processor 102 continues performing computations based a boundary of the first buffer 106 until the second delimiter 118 is reached.

Thus, in the illustrated example, a host data unit comprising the first portion 114 and the second portion 116 may be processed by the same processor (e.g., the first processor 102) despite originating from distance storage sources and being initially copied into input buffers of different processors. Accordingly, the system 100 may provide parallel processing of host data despite host data units being unaligned with data units of the storage system 100 and falling across several storage sources of the system 100. Therefore, the system 100 may be suited for various implementations in which host data may be broken across several storage sources, such as RAID systems.

The system 100 may have alternative configurations than illustrated in FIG. 1. For example, the system 100 may include a different number of processors (and corresponding buffers). Further, while the first buffer 106 and the second buffer 108 are illustrated as distinct components, they may be portions of a continuous memory space. Further, the system 100 may include a different number of storage sources. Additionally, components other than those shown may be included in the system 100. It should also be noted that components of the system 100 may be virtual components provided by the system 100 (e.g., by a processor executing a hypervisor or other emulation software). Further, while FIG. 1 illustrates a 1-to-1 correspondence between processors and storage sources, it should be noted that in some implementations a processor may be configured to receive and process data from more than one storage source. In some of these examples, a processor may be associated with (e.g., process data from) each memory source and then an additional processor may be associated with groups of memory sources. For example, each flash chip may have an associated processor and each flash channel (including several flash chips) may have an associated processor.

Figure 2:
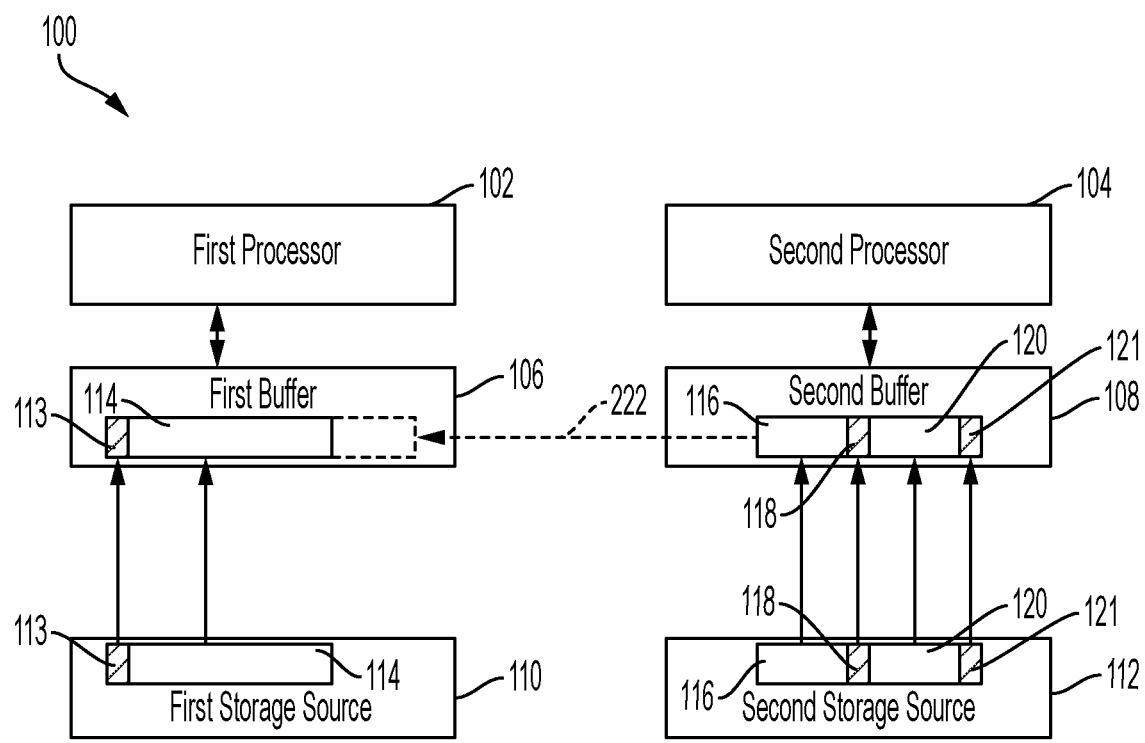
FIG. 2 is a block diagram illustrating an example of the system in which a processor is configured to transfer data to another processor for processing.

FIG. 2 is a block diagram illustrating an example of the system 100 in which a processor is configured to transfer data to another processor for processing. In the illustrated example, the second processor 104 transfers (e.g., copies) the second portion 116 to the first buffer 106 in response to the second portion 116 being located in front of a first delimiter (e.g., the second delimiter 118) in the second buffer 108, as indicated by arrow 222. The second processor 104 may utilize a DMA operation to transfer the second portion 116. In some implementations, the second processor 104 further transfers the second delimiter 118 to the first buffer 106. Transferring the second portion 116 to the first buffer 106 unites a host data unit comprising the first portion 114 and the second portion 116. Accordingly, the first processor 102 may perform a computation on the host data unit comprising the first portion 114 and the second portion 116.

Figure 3:
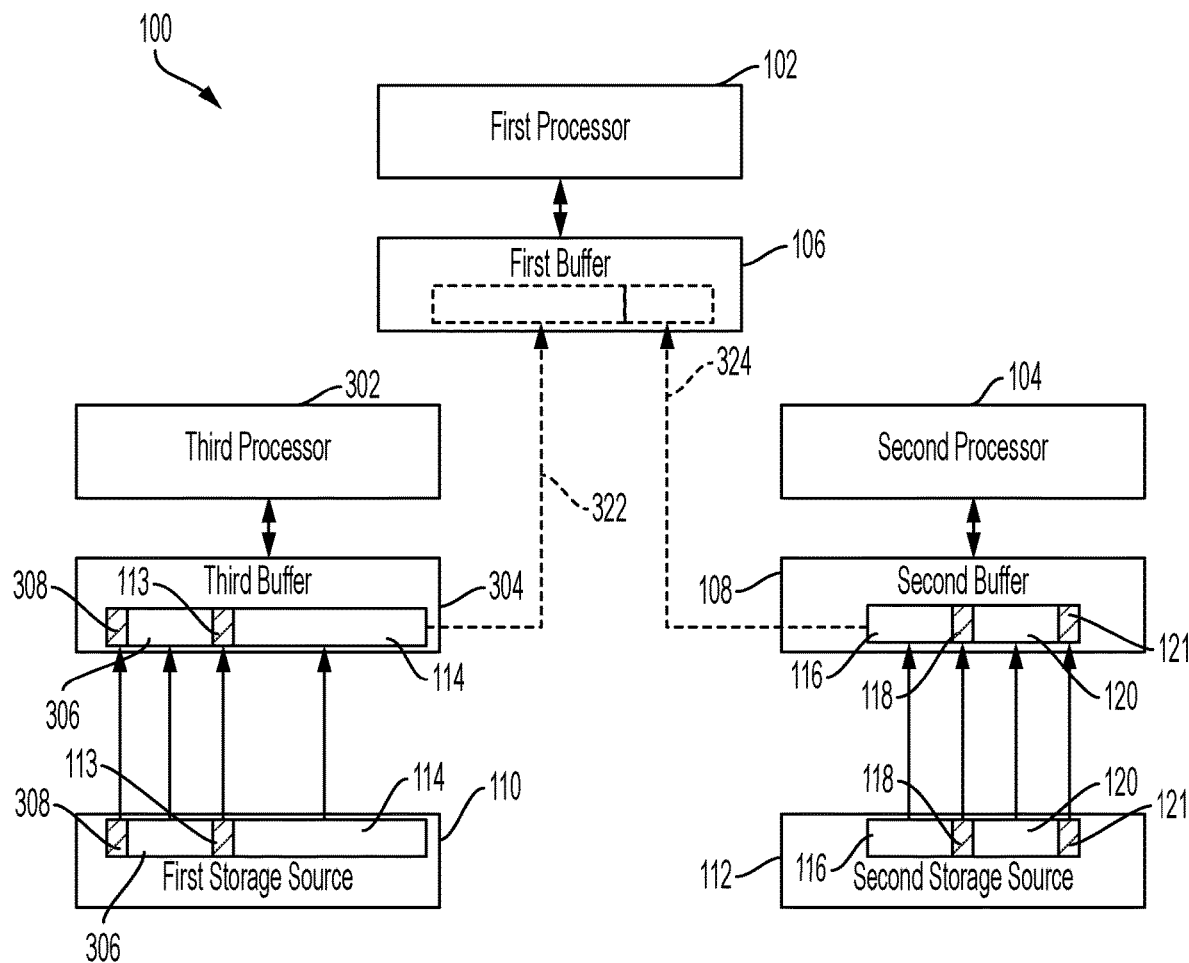
FIG. 3 is a block diagram illustrating an example of the system in which processors associated with storage sources send data from the storage sources to a processor associated with a group of storage sources for processing.

FIG. 3 is a block diagram illustrating an example of the system 100 in which processors associated with storage sources send data from the storage sources to a processor associated with a group of storage sources for processing. In the illustrated example, a third processor 302 is directly associated with the first storage source 110 and the first processor 102 is associated with a group including the first storage source 110 and the second storage source 112. For example, the third processor 302 may be configured to process data from a first flash chip corresponding to the first storage source 110, the second storage source 112 may be configured to process data from a second flash chip corresponding to the second storage source 112, and the first processor 102 may be configured to process data from a flash channel including the first storage source 110 and the second storage source 112.

In the illustrated example, a fourth delimiter 308, a fourth portion 306 of data, the first delimiter 113, and the first portion 114 are transferred (e.g., via DMA initiated by the third processor 302) from the first storage source 110 to a third buffer 304 of the third processor 302. The third processor 302 processes the fourth portion 306 based on the fourth portion 306 falling between a first delimiter (e.g., the fourth delimiter 308) in the third buffer 304 and a last delimiter (e.g., the first delimiter 113) in the third buffer 304. Based on the first portion 114 being located after the last delimiter in the third buffer 304, the third processor 302 initiates transfer of the first portion 114 to the first buffer 106, as indicated by arrow 322. In some examples, the third processor 302 transfers the first delimiter 113 in addition to the first portion 114. Further, based on the second portion 116 being located before a first delimiter (e.g., the second delimiter 118) in the second buffer, the second processor 104 initiates transfer of the second portion 116 to the first buffer 106, as indicated by arrow 324. In some examples, the second processor 104 transfers the second delimiter 118 in addition to the second portion 116. The first processor 102 may perform a computation on a whole host data unit comprising the first portion 114 and the second portion 116.

Figure 4:
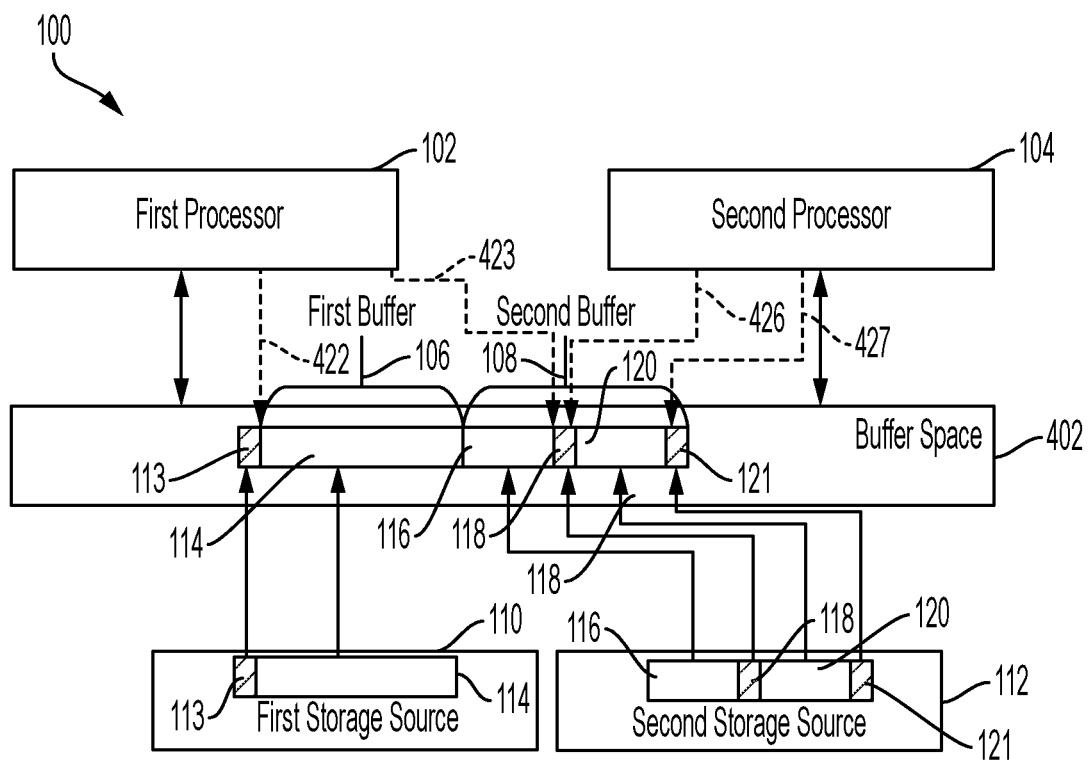
FIG. 4 is a block diagram illustrating an example of the system in which processors read past associated input buffers in a continuous memory space based on delimiter locations.

FIG. 4 is a block diagram illustrating an example of the system 100 in which processors read past associated input buffers in a continuous memory space based on delimiter locations. In the example of FIG. 4, the first buffer 106 and the second buffer 108 are part of a common buffer space 402. The buffer space 402 may correspond to a single physical memory device or to a virtual memory space supported by several memory devices. The first buffer 106 corresponds to an input buffer for the first processor 102 and the second buffer 108 corresponds to an input buffer for the second processor 104. However, the first processor 102 (and the second processor 104) may ignore data in an associated input buffer and/or process data in an input buffer of another processor based on delimiter locations. Ignoring data may include beginning processing at a location after that data.

In the illustrated example, the first processor 102 begins performing computations on data in the first buffer after a first delimiter (e.g., the first delimiter 113) in the first buffer 106, as indicated by arrow 422. In response to detecting data following a last delimiter (e.g., the first delimiter 113) in the first buffer 106, the first processor 102 further continues processing until reaching a first delimiter (e.g., the second delimiter 118) in a next input buffer (e.g., the second buffer 108), as indicated by arrow 423. Accordingly, the first processor 102 may perform one or more computations based on an entire host data unit comprising the first portion 114 and the second portion 116 despite the first portion 114 and the second portion originating from different storage sources and being input to different input buffers associated with different processors. Further, the second processor 104 may begin performing computations on data in the second buffer 108 that occurs following a first delimiter (e.g., the second delimiter 118) in the second buffer 108, as indicated by arrow 426. The second processor 104 continues until reaching a final delimiter (e.g., the third delimiter 121) in the second buffer 108, as shown by arrow 427. In examples in which additional data follows the final delimiter in the second buffer 108, the second processor 104 may continue to perform computations on data in a next buffer (not shown).

As illustrated, data between host data unit delimiters is processed by a single processor. Thus, FIG. 4 represents another example of how the system may perform parallel processing on data despite misalignment between host data units and storage system data units.

Figure 5:
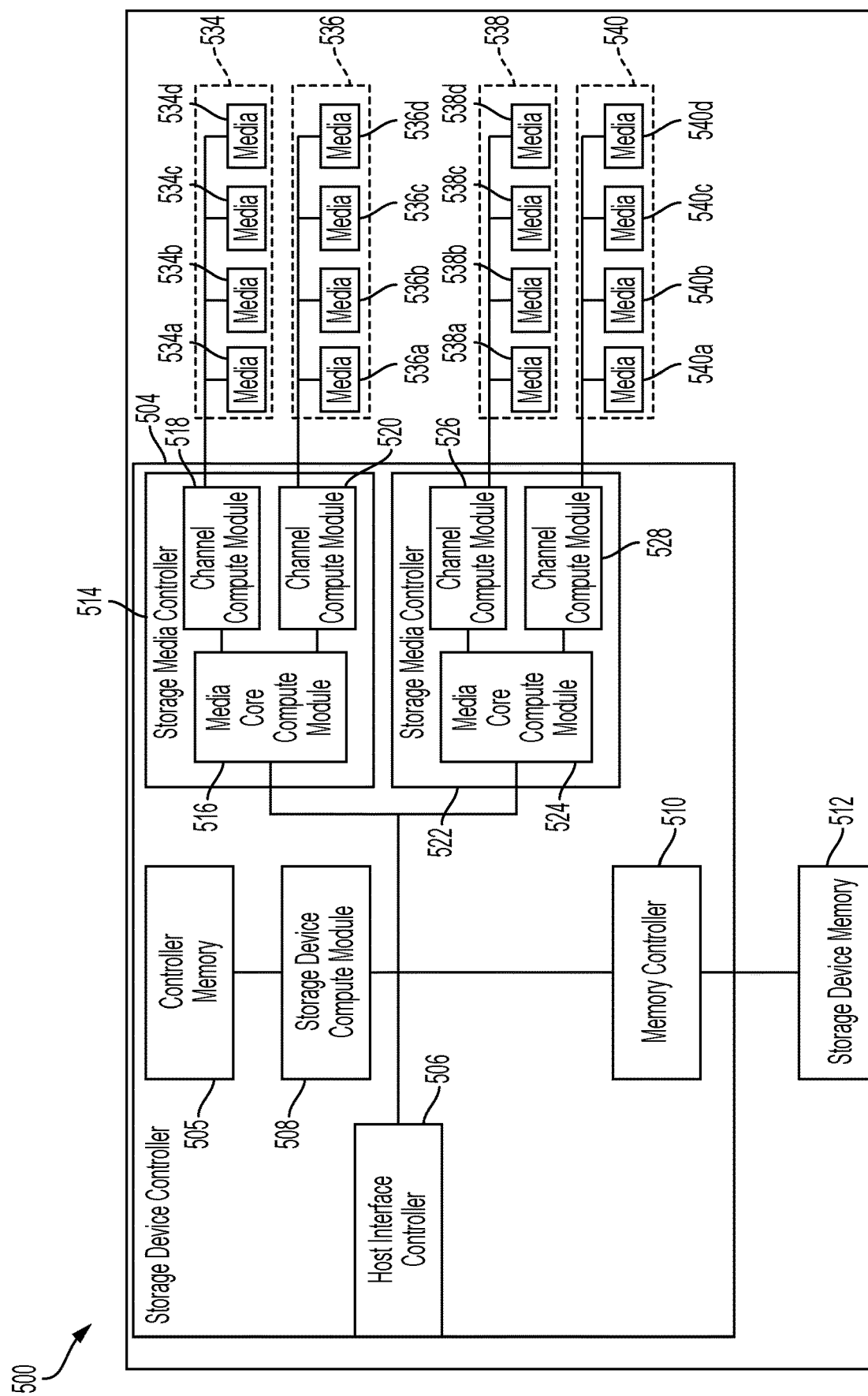
FIG. 5 is a block diagram of a storage device that supports parallel processing of data based on delimiters.

Referring to FIG. 5, an example of a storage device 500 that supports parallel processing of data is shown. The storage device 500 is a computational storage device and may include a solid state storage device (SSD), a hard disk device, another type of storage device, or a combination thereof. In the illustrated example, the storage device 500 includes a storage device controller 504 and storage media. The storage media includes a first channel 534 (e.g., a flash channel or other type of storage channel) that includes media device (e.g., a storage media device) 534a, media device 534b, media device 534c, and media device 534d. The storage media further includes a second channel 536 (e.g., a flash channel or other type of storage channel) that includes media device 536a, media device 536b, media device 536c, and media device 536d. The storage media further includes a third channel 538 (e.g., a flash channel or other type of storage channel) that includes media device 538a, media device 538b, media device 538c, and media device 538d. The storage media further includes a fourth channel 540 (e.g., a flash channel or other type of storage channel) that includes media device 540a, media device 540b, media device 540c, and media device 540d. The media devices 534a-d, 536a-d, 538a-d, 540a-d may include NAND flash chips, hard disk media, other types of storage media, or a combination thereof.

The first storage source 110 and the second storage source 112 of FIGS. 1-4 may correspond to different elements of a group including the media devices 534a-d, 536a-d, 538a-d, 540a-d, one of the channels 534, 536, 538, 540, a group of the channels 534, 536, 538, 540, or some other aspect of the storage media of the storage device 500. In some examples, the storage media has a different configuration than shown. For example, the storage device 500 may include more or fewer channels, more or fewer media devices per channel, more or fewer channels per channel group, or a combination thereof. Further, it should be noted that in some implementations, elements of the storage device 500 are virtual.

The storage device 500 further includes a storage device memory 512. The storage device memory 512 may include a memory device, such as a DRAM device, an SRAM device, another type of memory device, or a combination thereof. In some examples, the storage device memory 512 includes more than one device.

The storage device controller 504 includes a host interface controller 506, a controller memory 505, a storage device compute module 508, a memory controller 510, a first storage media controller 514, and a second storage media controller 522. The host interface controller 506 may include hardware components, firmware, software, or a combination thereof configured to provide an interface to a host device. In some implementations, the interface includes a non-volatile memory express (NVMe) interface, a compute express link (CXL) interface, or another type of storage interface.

The controller memory 505 may include a memory device, such as a DRAM device, an SRAM device, another type of memory device, or a combination thereof. In some examples, the controller memory 505 includes more than one device. In some examples, the controller memory 505 and the storage device memory 512 are different types of memory with different characteristics (e.g., latency, capacity, etc.). To illustrate, the controller memory 505 may include SRAM while the storage device memory 512 includes DRAM.

The storage device controller 504 further includes a storage device compute module 508. The storage device controller 504 is configured to perform computations based on data stored in the storage media of the storage device 500. Such computations may include filter operations, mathematical operations, search operations, etc. As described further herein, the storage device compute module 508 may include an input buffer, an output buffer, and a processor. The input and output buffers may be separate components included in the storage device compute module 508 or may include ranges of memory included in the controller memory 505 and/or the storage device memory 512.

The first storage media controller 514 includes a flash controller or other type of storage controller. In various examples, the first storage media controller 514 includes hardware, firmware, software, or a combination thereof configured to control access to the first channel 534 (and associated media devices 534*a-d*, 536*a-d*) and the second channel 536 (and associated media devices 536*a-d*, 536*a-d*). Controlling access may include performing translations of memory addresses to and from an address space used by the media devices 534*a-d*, 536*a-d* and initiating data transfers to and from the media devices 534*a-d*, 536*a-d*.

Similarly, the second storage media controller 522 includes a flash controller or other type of storage controller. In various examples, the second storage media controller 522 includes hardware, firmware, software, or a combination thereof configured to control access to the third channel 538 (and associated media devices 538*a-d*, 538*a-d*) and the fourth channel 540 (and associated media devices 540*a-d*, 540*a-d*). Controlling access may include performing translations of memory addresses to and from an address space used by the media devices 538*a-d*, 538*a-d* and initiating data transfers to and from the media devices 540*a-d*, 540*a-d*.

The first storage media controller 514 further includes a first media core compute module 516. The first media core compute module 516 is configured to perform computations based on data stored in the media devices 534*a-d*, 536*a-d* connected to the first storage media controller 514. Such computations may include filter operations, mathematical operations, search operations, etc. As described further herein, the first media core compute module 516 may include an input buffer, an output buffer, and a processor. The input and output buffers may be distinct components included in the first media core compute module 516 or may include ranges of memory included in the controller memory 505 and/or the storage device memory 512.

The first storage media controller 514 further includes a first channel compute module 518. The first channel compute module 518 is configured to perform computations based on data stored in the media devices 534*a-d* of the first channel 534. Such computations may include filter operations, mathematical operations, search operations, etc. As described further herein, the first channel compute module 518 may include an input buffer, an output buffer, and a processor. The input and output buffers may be distinct components included in the first channel compute module 518 or may include ranges of memory included in the controller memory 505 and/or the storage device memory 512.

The first storage media controller 514 further includes a second channel compute module 520 configured to perform computations based on data stored in the media devices 536*a*-d of the second channel 536. Such computations may include filter operations, mathematical operations, search operations, etc. As described further herein, the second channel compute module 520 may include an input buffer, an output buffer, and a processor. The input and output buffers may be distinct components included in the second channel compute module 520 or may include ranges of memory included in the controller memory 505 and/or the storage device memory 512.

The second storage media controller 522 further includes a second media core compute module 524. The second media core compute module 524 is configured to perform computations based on data stored in the media devices 538*a-d*, 540*a-d* connected to the second storage media controller 522. Such computations may include filter operations, mathematical operations, search operations, etc. As described further herein, the second media core compute module 524 may include an input buffer, an output buffer, and a processor. The input and output buffers may be distinct components included in the second media core compute module 524 or may include ranges of memory included in the controller memory 505 and/or the storage device memory 512.

The second storage media controller 522 further includes a third channel compute module 526. The third channel compute module 526 is configured to perform computations based on data stored in the media devices 538*a-d* of the third channel 538. Such computations may include filter operations, mathematical operations, search operations, etc. As described further herein, the third channel compute module 526 may include an input buffer, an output buffer, and a processor. The input and output buffers may be distinct components included in the third channel compute module 526 or may include ranges of memory included in the controller memory 505 and/or the storage device memory 512.

The first storage media controller 514 further includes a second channel compute module 520 configured to perform computations based on data stored in the media devices 536*a*-d of the second channel 536. Such computations may include filter operations, mathematical operations, search operations, etc. As described further herein, the second channel compute module 520 may include an input buffer, an output buffer, and a processor. The input and output buffers may be separate components included in the first storage media controller 514 or may include ranges of memory included in the controller memory 505 and/or the storage device memory 512.

It should be noted that the compute modules 516, 518, 520, 524, 526, 528 may be external to the storage media controllers 514, 522 in some implementations. Further, the storage device 500 may include a different number of channel compute modules and/or media core compute modules than shown. While not illustrated, one or more of the media devices 534*a-d*, 536*a-d*, 538*a-d*, 540*a-d* may have an associated compute module. These compute modules may have a structure similar to those of the channel compute modules 518, 520, 526, 528 and the media core compute modules 516, 524 and each may be configured to perform computations on data from a respective media device. In some implementations, the first processor 102 and the first buffer 106 correspond to one of the compute modules of the media devices 534*a-d*, 536*a-d*, 538*a-d*, 540*a-d*, the channel compute modules 518, 520, 526, 528, and the media core compute modules 516, 524. The second processor 104 and the second buffer 108 may correspond to a different one of the compute modules of the media devices 534a-d, 536a-d, 538a-d, 540a-d, the channel compute modules 518, 520, 526, 528, and the media core compute modules 516, 524. The third processor 302 and the third buffer 304 may correspond to one of the channel compute modules 518, 520, 526, 528, the media core compute modules 516, 524, and the storage device compute module 508.

Each of the first buffer 106, the second buffer 108, and the third buffer 304 may be implemented in the controller memory 505, in the storage device memory 512, in a memory of a compute module corresponding to a media device, in a memory of the first channel compute module 518, in a memory of the second channel compute module 520, in a memory of the third channel compute module 526, in a memory of the fourth channel compute module 528, in a memory of the first media core compute module 516, in a memory of the second media core compute module 524, in a memory of the storage device compute module 508, in a different component of the storage device 500, or a combination thereof.

In response to a host command (or other trigger), the storage device controller 504 may initiate transfer of data from one or more of the media devices 534a-d, 536a-d, 538a-d, 540a-d to one or more input buffers of compute modules. The compute modules may include compute modules associated with the media devices 534a-d, 536a-d, 538a-d, 540a-d, the channel compute modules 518, 520, 526, 528, the media core compute modules 516, 524, the storage device compute module 508, or a combination thereof. The compute modules that receive the data perform one or more computations on the data to generate results. However, individual host data units may be split across input buffers because the individual host data units may be split across the media devices 534a-d, 536a-d, 538a-d, 540a-d, the channel compute modules 518, 520, 526, 528. In order to process whole host data units, the compute modules perform the computations based on locations of delimiters in the input buffers, as described herein. For example, based on locations of delimiters in the data, compute modules may transfer data to other input buffers and/or may access input buffers associated with other compute modules. Additionally, in some implementations, compute modules of the storage device 500 are configured to operate on data as the data is streamed into (e.g., read into) the corresponding input buffer. Based on delimiter position in an input buffer, a compute module may delay performing computations until an entire host data unit is available to the compute module. Accordingly, an individual host data unit may be processed by a single processor.

Figure 6:
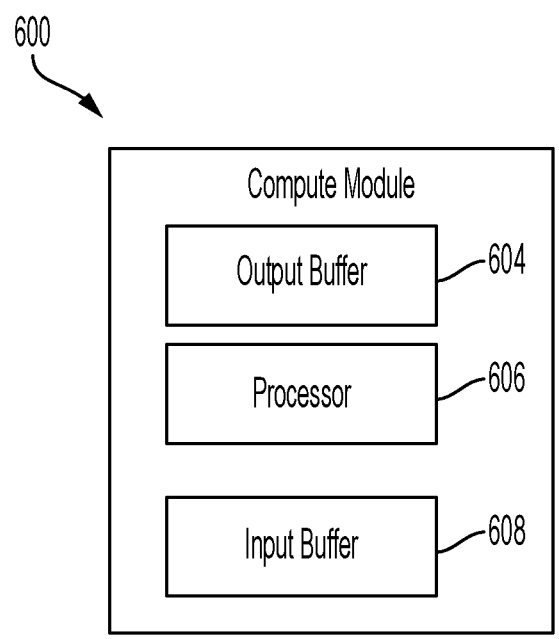
FIG. 6 is a diagram of a compute module.

Referring to FIG. 6, an example of a compute module 600 is shown. Compute modules of the media devices 534a-d, 536a-d, 538a-d, 540a-d, the first media core compute module 516, the first channel compute module 518, the second channel compute module 520, the second media core compute module 524, the third channel compute module 526, the fourth channel compute module 528, and the storage device compute module 508 may be analogous to the compute module 600. The compute module 600 includes an output buffer 604, a processor 606, and an input buffer 608. The output buffer 604 may correspond to a memory device such, as a DRAM or SRAM device. Similarly, the input buffer 608 may correspond to a memory device, such as a DRAM or SRAM device. In some implementations, the output buffer 604 and the input buffer 608 correspond to regions of one memory (e.g., a physical or virtual memory space). While illustrated as components of the compute module 600, it should be noted that the output buffer 604 and the input buffer 608 may be implemented as regions of a memory external to the compute module 600, such as the storage device memory 512, the controller memory 505, or a combination thereof. The input buffer 608 may correspond to the first buffer 106, the second buffer 108, or the third buffer 304.

The processor 606 may correspond to the first processor 102, the second processor 104, or the third processor 302. The processor 606 may include a FPGA, a CPU, a GPU, an ASIC, another type of processor, or a combination thereof. The processor 606 is configured to perform computations based on data in the input buffer 608 and output results of the computations to the output buffer 604. As described above and below, the processor 606 may perform the computations based on locations of delimiters in the input buffer 608. Based on these delimiters, the processor 606 may transfer (e.g., copy) data to another input buffer for processing by another processor, process data outside of the input buffer 608, or a combination thereof in order to keep host data units together. Additionally, the processor 606 may delay performing computations based on delimiters in the input buffer 608.

Storage devices (e.g., the storage device 500) and storage systems (e.g., the system 100) disclosed herein perform delimiter based processing of data stored in storage media. In some implementations, compute modules operating in parallel pass data between each other based on the delimiters. In some implementations, a compute module passes to another compute module downstream in a parallel computing hierarchy based on the delimiters. In some implementations, a compute module reads past a boundary of an associated input buffer into another compute module's input buffer based on the delimiters. Aspects of these implementations may be combined.

Figure 7:
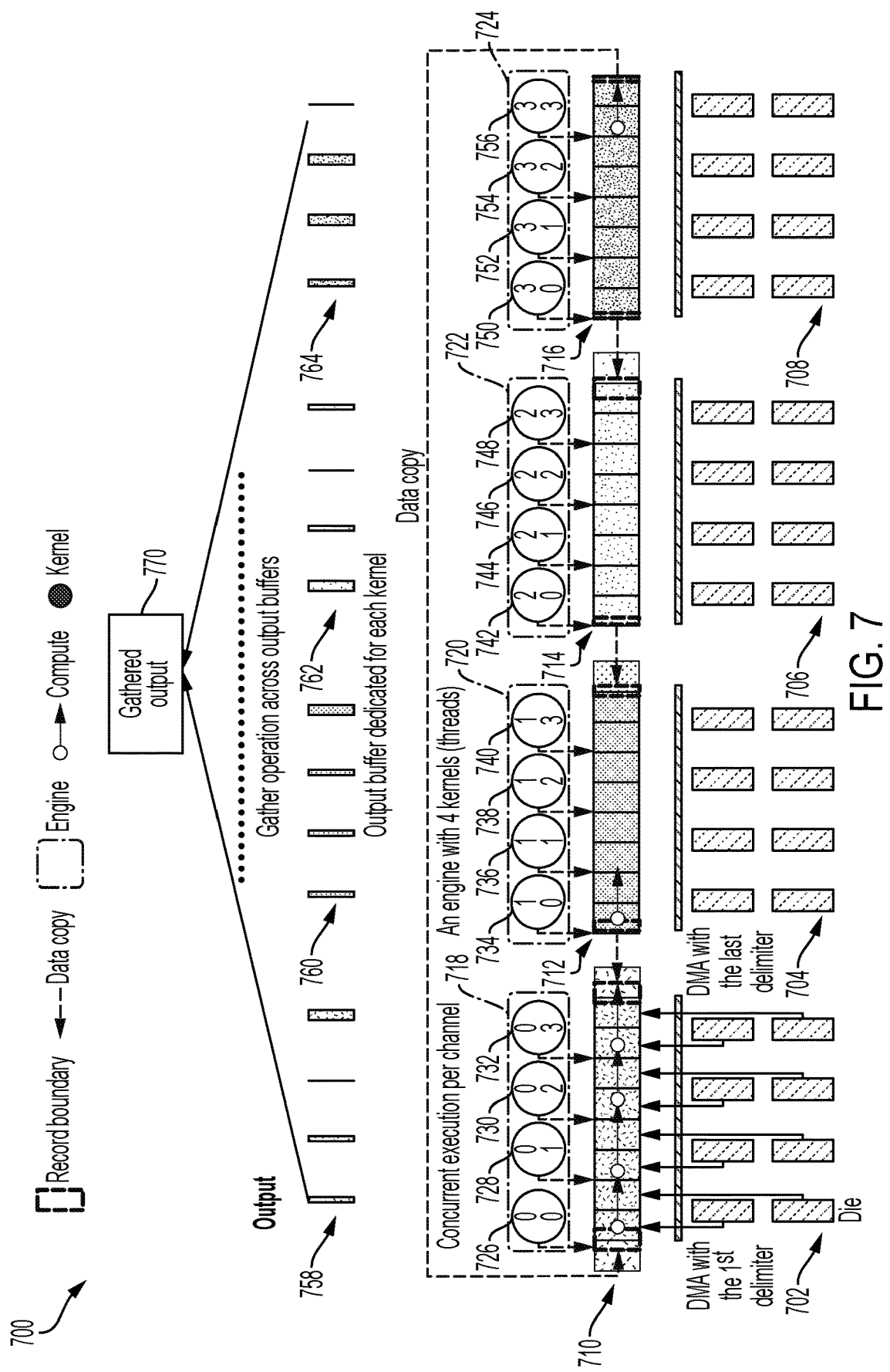
FIG. 7 is a diagram of a device performing delimiter based parallel computations in which compute modules operating in parallel pass data between each other.

FIG. 7 is a diagram illustrating an example of a device 700 performing delimiter based parallel computations in which compute modules operating in parallel pass data between each other. The device 700 may correspond to the storage device 500 of FIG. 5. FIG. 7 depicts a first processor 718, a second processor 720, a third processor 722, and a fourth processor 724. The first processor 718 has a corresponding first input buffer 710, the second processor 720 has a corresponding second input buffer 712, the third processor 722 has a corresponding third input buffer 714, and the fourth processor 724 has a corresponding fourth input buffer 716. Further, the first processor 718 has a corresponding first output buffer 758, the second processor 720 has a corresponding second output buffer 760, the third processor has a corresponding third output buffer 762, and the fourth processor has a corresponding fourth output buffer 764. Each processor and corresponding input buffer and output buffer may be a compute module analogous to the compute module 600.

The first input buffer 710 is configured to receive data from a first storage source 702, the second input buffer 712 is configured to receive data from a second storage source 704, the third input buffer 714 is configured to receive data from a third storage source 706, and the fourth input buffer 716 is configured to receive data from a fourth storage source 708. In the illustrated example, the storage sources correspond to storage channels. Accordingly, the first storage source 702 may correspond to the first channel 534, the second storage source 704 may correspond to the second channel 536, the third storage source 706 may correspond to the third channel 538, and the fourth storage source 708 may correspond to the fourth channel 540. Further, the first input buffer 710, the first processor 718, and the first output buffer 758 may correspond to the first channel compute module 518; the second input buffer 712, the second processor 720, and the second output buffer 760 may correspond to the second channel compute module 520; the third input buffer 714, the third processor 722, and the third output buffer 762 may correspond to the third channel compute module 526; and the fourth input buffer 716, the fourth processor 724, and the fourth output buffer 764 may correspond to the fourth channel compute module 528.

The device 700 further includes a gathered output buffer 770. The gathered output buffer 770 may correspond to an output buffer of a compute module downstream from the processors 718, 720, 722, 724. As used herein, "downstream" indicates a direction toward an output of a processing pipeline. For example, the gathered output buffer 770 may correspond to an output buffer of the storage device compute module 508, which is downstream of the channel compute modules 518, 520, 520, 526, 528.

In operation, data is copied from the first storage source 702 to the first input buffer 710, data is copied from the second storage source 704 to the second input buffer 712, data is copied from the third storage source 706 to the third input buffer 714, and data is copied from the fourth storage source 708 to the fourth input buffer 716. The data may be copied into the input buffers 710, 712, 714, 716 using a DMA transfer or other type of memory transfer. In some implementations, data copy operations are initiated in response to a command to perform an operation on the data (e.g., a search operation, a filter operation, a mathematical operation, etc.). Such a command may be received from a host device (e.g., through the host interface controller 506). The data copy operations may be initiated by the processors 718, 720, 722, 724, by an upstream processor, or by another component of a storage device controller (e.g., the storage device controller 504).

Data is copied into the input buffers 710, 712, 714, 716 in sequence such that a whole host data unit is defined by two adjacent delimiters. Further, data copied into a final position of an input buffer is succeeded in the sequence by data copied into a first position of a next input buffer. Thus, data received by the first input buffer 710 may be followed by data received by the second input buffer 712 in the sequence. Similarly, data received by the second input buffer 712 may be followed by data received by the third input buffer 714 in the sequence and data received by the third input buffer 714 may be followed by data received by the fourth input buffer 716 in the sequence. Data may be streamed into the input buffers 710, 712, 714, 716 as computations are performed by the processors 718, 720, 722, 724.

The first input buffer 710 (e.g., the first input buffer in a parallel processing pipeline stage) may include additional space at a beginning and an end of the input buffer. Data copied from the first storage source 702 may be placed between the additional space at the beginning and the additional space at the end. The additional space may correspond to host data unit size (e.g., a file size), to a device data unit size (e.g., a block), to another unit, or to a multiple of any of these data unit sizes.

The fourth input buffer 716 (e.g., the last input buffer in a parallel processing pipeline stage) may not include additional buffer space. The second input buffer 712 and the third input buffer 714 (e.g., input buffers between the first and last input buffers in a parallel processing stage) may each include additional space at ends of the input buffers 712, 714.

As data is streamed copied into the first input buffer 718, the first processor 718 is configured to track a position of a first delimiter in the first input buffer 710 and a position of a last delimiter in the first input buffer 710. Similarly, the second processor 720 tracks positions of first and last delimiters in the second input buffer 712, the third processor 722 tracks positions of first and last delimiters in the third input buffer 714, and the fourth processor 724 tracks positions of first and last delimiters in the fourth input buffer 716. The processors 718, 720, 722, 724 may perform computations on data falling between the first and last delimiters in the respective input buffers.

The second processor 720, the third processor 722, and the fourth processor 724 (e.g., processors after the first processor the first processor 718 in a parallel processing stage) are configured to transfer data occurring in a respective input buffer before the first delimiter to a previous input buffer, as part of a forwarding process. In FIG. 7, the second processor 720 initiates transfer of data occurring before the first delimiter in the second input buffer 712 into the additional space at the end of the first input buffer 710. Similarly, the third processor 722 initiates transfer of data occurring before the first delimiter in the third input buffer to the additional space at the end of the second input buffer 712, and the fourth processor 724 initiates transfer of data occurring before the first delimiter in the fourth input buffer 716 to the additional space at the end of the third input buffer 714. The first processor 718 may perform computations on data transferred into the first input buffer 710 along with data following the last delimiter in the first input buffer 710. Further, the second processor 720 may perform computations on data transferred into the second input buffer 712 by the third processor 722 along with data following the last delimiter in the second input buffer 712. Further, the third processor 722 may perform computations on data transferred into the third input buffer 714 by the fourth processor 724 along with data following the last delimiter in the third input buffer 714. Accordingly, a portion of a host data unit that falls before a first delimiter in an input buffer may be reunited with a remaining portion of the host data unit in a previous input buffer prior to processing. In some implementations, the processors 720, 722, 724 transfer the first delimiter to the previous input buffer in addition to transferring data occurring before the first delimiter.

The fourth processor 724 (e.g., a final processor in a parallel processing stage) further transfers data occurring after a final delimiter in the fourth input buffer 716 to the additional space at the beginning of the first input buffer 710 (e.g., the first input buffer in the parallel processing stage) as part of a carryover process. The first processor 718 may perform computations on the data transferred into the first input buffer 710 by the fourth processor 724 with data that occurs before the first delimiter of the first input buffer 710. Accordingly, a host data unit split between an end of the fourth input buffer 716 and the beginning of the first input buffer 710 may be reunited prior to processing. The final processor may further transfer the final delimiter with the data.

Each of the processors 718, 720, 722, 724 in the device 700 includes four kernels. A different number of kernels may be included than shown. Each kernel may include hardware and/or executable software configured to perform a computation on data (e.g., a search function, a filter function, a mathematical operation, etc.) to generate output. The first processor 718 includes a first kernel 726, a second kernel 728, a third kernel 730, and a fourth kernel 732. The second processor 720 includes a fifth kernel 734, a sixth kernel 736, a seventh kernel 738, and an eighth kernel 740. The third processor 722 includes a ninth kernel 742, a tenth kernel 744, an eleventh kernel 746, and a twelfth kernel 748. The fourth processor 724 includes a thirteenth kernel 750, a fourteenth kernel 752, a fifteenth kernel 754, and a sixteenth kernel 756. Each of the kernels 726, 728, 730, 732, 734, 736, 738, 740, 742, 744, 746, 748, 750, 752, 754, 756 may perform computations in parallel to generate output. The kernels 726, 728, 730, 732, 734, 736, 738, 740, 742, 744, 746, 748, 750, 752, 754, 756 may be set to perform computations based on delimiter locations. For example, the kernels 726, 728, 730, 732, 734, 736, 738, 740, 742, 744, 746, 748, 750, 752, 754, 756 may begin computations at data immediately following a delimiter. Fewer than all of the kernels 726, 728, 730, 732, 734, 736, 738, 740, 742, 744, 746, 748, 750, 752, 754, 756 may be used in a particular execution cycle.

Output of computations performed by the first processor 718 is placed into the first output buffer 758. Output of computations performed by the second processor 720 is placed into the second output buffer 760. Output of computations performed by the third processor 722 is placed into the third output buffer 762. Output of computations performed by the fourth processor 724 is placed into the fourth output buffer 764.

Outputs in the output buffers 758, 760, 762, 764 is gathered into the gathered output buffer 770 (e.g., by a downstream processor, such as a processor in the storage device compute module 508) for output and/or additional processing.

Thus, FIG. 7 illustrates an example in which a system performs carryover and forwarding operations based on first and last delimiter locations in order to keep host data units together for computation. Accordingly, parallel processing may be performed despite host data units being split across multiple storage sources and processor input buffers.

Figure 8:
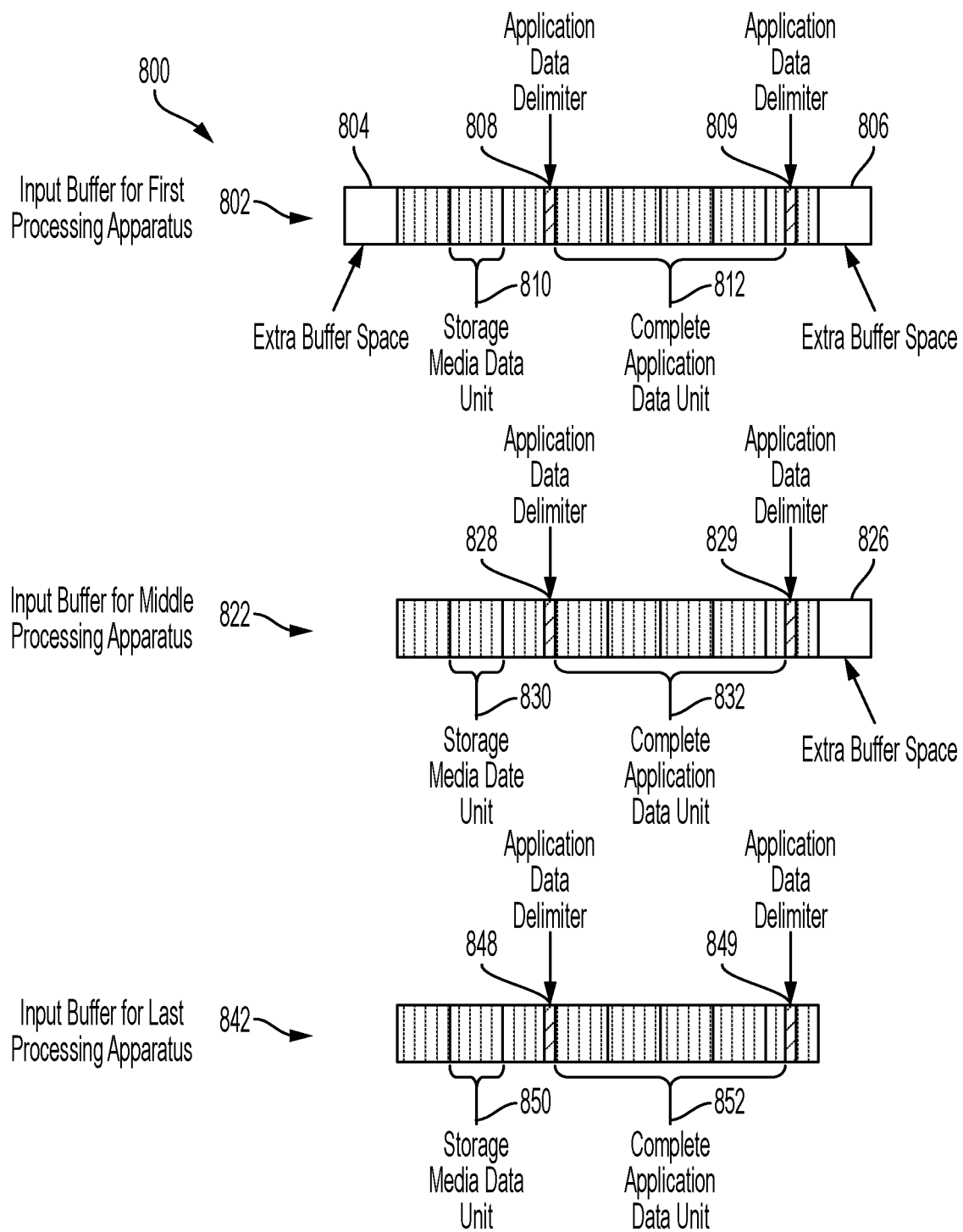
FIG. 8 showing examples of input buffer structures.

FIG. 8 is a diagram 800 showing examples of input buffer structures usable by the device 700 depicted in FIG. 7. The diagram 800 depicts a first buffer 802 following a copy from a storage source. The first buffer 802 corresponds to an input buffer for a first processing apparatus in a parallel processing stage. The first buffer 802 may correspond to the first input buffer 710. As shown, the first buffer 802 includes first extra buffer space 804 and second extra buffer space 806. The first extra buffer space 804 and the second extra buffer space 806 may have sizes based on a storage media data unit, based on a host data unit, or based on some other data unit. In some implementations, the first extra buffer space 804 corresponds to a third of the size of the first buffer 802 and the second extra buffer space 804 corresponds to a third of the size of the first buffer 802. Data from the storage source is copied in between the extra buffer spaces 804, 806. The data transferred into the first buffer 802 may be in storage media data units. An example storage media data unit 810 is shown. A size of the storage media data unit 810 may be different from a size of host data units utilized by a host application (e.g., an application data unit). An example complete application data unit 812 (e.g., a host data unit) is shown between a first application data delimiter 808 and a second application data delimiter 809. Because storage media data units and host data units may not be aligned, host data units may be split across storage sources. In the illustrated example, an incomplete host data unit is located before the first delimiter 808 and an incomplete host data unit is located after the second delimiter 809. The incomplete host data unit occurring before the first delimiter 808 may be completed by a carryover operation into the first extra buffer space 804 (e.g., as shown and described with reference to FIG. 7). Similarly, the host data unit occurring after the second delimiter 809 may be completed by a forwarding operation (e.g., as shown and described with reference to FIG. 7) into the second extra buffer space 806.

The diagram 800 further depicts a second buffer 822 following a data copy from a storage source. The second buffer 822 corresponds to an input buffer for a processing apparatus in between first and last processing apparatuses in a parallel processing stage. The second buffer 822 may correspond to the second input buffer 712 or to the third input buffer 714. As shown, the second buffer 822 includes extra buffer space 826. The extra buffer space 826 may have a size based on a storage media data unit, based on a host data unit, or based on some other data unit. In some implementations the extra buffer space 826 is half of total space of the second buffer 822. In some implementations, the total space of the second buffer 822 is two thirds the size of the total space of the first buffer 802. Data from the storage source is copied into the second buffer 822 before the extra buffer space 826. The data transferred into the second buffer 822 may be in storage media data units. An example storage media data unit 830 is shown. A size of the storage media data unit 830 may be different from a size of host data units utilized by a host application (e.g., an application data unit). An example complete application data unit 832 (e.g., a host data unit) is shown between a first application data delimiter 828 and a second application data delimiter 829. Because storage media data units and host data units may not be aligned, host data units may be split across storage sources. In the illustrated example, an incomplete host data unit is located before the first delimiter 828 and an incomplete host data unit is located after the second delimiter 829. The incomplete host data unit occurring before the first delimiter 828 may be transferred by a forwarding operation into an extra buffer space of a previous input buffer (e.g., as shown and described with reference to FIG. 7). The data unit occurring after the second delimiter 829 may be completed by a forwarding operation from another input buffer into the extra buffer space 826 (e.g., as shown and described with reference to FIG. 7).

The device 700 may have alternative configurations. For example, each of the input buffers 710, 712, 714, 716 may receive data from a different storage source than shown (e.g., a single media device, a group of storage channels, etc.). Additionally, the system may have more or fewer components (e.g., storage sources, compute modules, etc.) than shown. Further, processors may execute a different number of kernels than shown.

The diagram 800 further depicts a third buffer 842 following a data copy from a storage source. The third buffer 842 corresponds to an input buffer for a last processing apparatus in a parallel processing stage. The third buffer 842 may correspond to the fourth input buffer 716. A size of the third buffer 842 may be one third a total size of the first buffer 802 (e.g., because the third buffer lacks extra buffer space). Data from the storage source is copied into the third buffer 842. The data transferred into the third buffer 842 may be in storage media data units. An example storage media data unit 850 is shown. A size of the storage media data unit 850 may be different from a size of host data units utilized by a host application (e.g., an application data unit). An example complete application data unit 852 (e.g., a host data unit) is shown between a first application data delimiter 848 and a second application data delimiter 849. Because storage media data units and host data units may not be aligned, host data units may be split across storage sources. In the illustrated example, an incomplete host data unit is located before the first delimiter 848 and an incomplete host data unit is located after the second delimiter 849. The incomplete host data unit occurring before the first delimiter 848 may be transferred by a forwarding operation into an extra buffer space of a previous input buffer (e.g., as shown and described with reference to FIG. 7). The data unit occurring after the second delimiter 849 transferred by a carryover operation into an extra buffer space of a first input buffer in a parallel processing stage (e.g., into the first extra buffer space 804).

As shown, first input buffers may maintain extra buffer space at a front end for carryover operations from a last input buffer. Further, input buffers before the last input buffer may maintain extra buffer space for forwarding operations. Accordingly, processors performing delimiter based parallel processing may reassemble complete host data units using carryover and forwarding operations, as described in FIG. 7.

Figure 9:
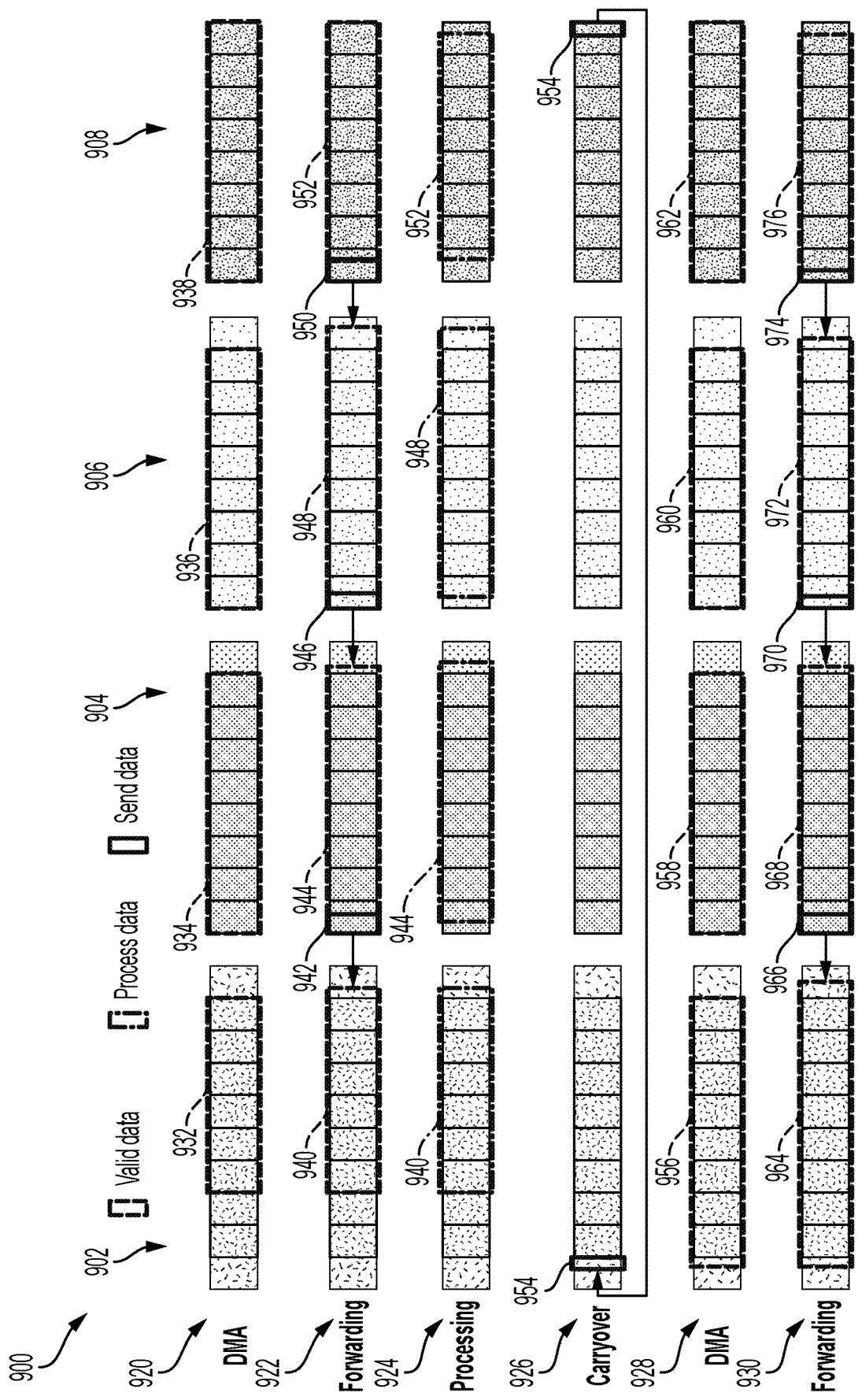
FIG. 9 is a diagram showing a process 900 for performing delimiter based parallel processing.

Referring to FIG. 9, a diagram showing a process 900 for performing delimiter based parallel processing is shown. The process 900 may be performed by a storage device or system, including the system 100 or the storage device 500. The diagram depicts a first input buffer 902, a second input buffer 904, a third input buffer 906, and a fourth input buffer 908. The first input buffer 902 may correspond to the first input buffer 710, the second input buffer 904 may correspond to the second input buffer 712, the third input buffer 906 may correspond to the third input buffer 714, and the fourth input buffer 908 may correspond to the fourth input buffer 716.

The process 900 includes a first DMA operation 920, a first forwarding operation 922, a processing operation 924, a carryover operation 926, a second DMA operation 928, and a second forwarding operation 930.

In the first DMA operation 920, first valid data 932 is copied into the first buffer 902 (e.g., by the first processor 718) from a storage source (e.g., from the first storage source 702). Further, second valid data 934 is copied into the second buffer 904 (e.g., by the second processor 720) from a storage source (e.g., the second storage source 704). Further, third valid data 936 is copied into the third buffer 906 (e.g., by the third processor 722) from a storage source (e.g., the third storage source 706). Further, fourth valid data 938 is copied into the fourth buffer 908 (e.g., by the fourth processor 724) from a storage source (e.g., the fourth storage source 708). As shown, the first buffer 902 has extra buffer space before (e.g., the first extra buffer space 804) and after (e.g., the second extra buffer space 806) the first valid data 932. Additionally, the second buffer 904 and the third buffer 906 have extra buffer space after the second valid data 934 and the third valid data 936 respectively. During the DMA first DMA operation 920, processors associated with the buffers 902, 904, 906, 908 identify locations of delimiters within the valid data 932, 934, 936, 938 (e.g., in the buffers 902, 904, 906, 908). In particular, the processors may identify locations of first and last delimiters within each of the buffers 902, 904, 906, 908.

During the first forwarding operation 922, a processor associated with the second buffer 904 identifies first data 942 before a first delimiter in the second valid data 934 and forwards the first data 942 to the first buffer 902 to form first modified valid data 940 when combined with the valid data 932.

Further, a processor associated with the third buffer 906 identifies second data 946 before a first delimiter in the third valid data 936 and forwards the second data 946 to the second buffer 904. Adding the second data 946 and removing the first data 942 from the second valid data 934 forms second modified valid data 944.

Further, a processor associated with the fourth buffer 908 identifies third data 950 before a first delimiter of the fourth valid data 952 and forwards the third data 950 to the third buffer 906. Adding the third data 950 and removing the second data 946 from the third valid data 936 forms third modified valid data 948. Removing the third data 950 from the fourth valid data 938 forms the fourth modified valid data 952.

In the first processing operation 924, the processor associated with the first buffer performs computations based on the first modified valid data 940. The processor associated with the second buffer 904 performs computations based on the second modified valid data 944. The processor associated with the third buffer 906 performs computations based on the third modified valid data 948. The processor associated with the fourth buffer 908 performs computations based on the fourth modified valid data 952 up to a final delimiter in the fourth modified valid data 952.

In the carryover operation 926, the processor associated with the fourth buffer 908 identifies fourth data 954 following a final delimiter in the fourth modified valid data 952 and transfers (e.g., carries over) the fourth data 954 to the first buffer 902 (e.g., into extra space at the front of the first buffer 902).

In the second DMA operation 928, the processor associated with the first buffer 902 copies data from a storage source into the first buffer to form fifth valid data 956 when combined with the fourth data 954. The processor associated with the second buffer 904 copies data from a storage source into the second buffer 904 to form sixth valid data 958. The processor associated with the third buffer 906 copies data from a storage source into the third buffer 906 to form seventh valid data 960. The processor associated with the fourth buffer 908 copies data from a storage source into the fourth buffer to form eighth valid data 962. The processors identify first and last delimiter locations in the buffers 902, 904, 906, 908 during the second DMA operation 928.

In the second forwarding operation 930, the processor associated with the second buffer 904 identifies fifth data 966 occurring before a first delimiter in the sixth valid data 958 and forwards the fifth data 966 to form fifth modified valid data 964. The processor associated with the third buffer 906 identifies sixth data 970 occurring before a first delimiter in the seventh valid data 960 and forwards the sixth data 970 to the second buffer 904. Adding the sixth data 970 to the sixth valid data 958 and subtracting the fifth data 966 forms sixth modified valid data 968. The processor associated with the fourth buffer 908 may identify seventh data 974 before a first delimiter in the eighth valid data 962 and forward the seventh data 974 to the third buffer 906. Adding the seventh data 974 and subtracting the sixth data 970 from the seventh valid data 960 may form seventh modified valid data 972. Subtracting the seventh data 974 from the valid data 962 may form eighth modified valid data 976 in the fourth buffer 908.

The process 900 may continue on with additional processing, carryover, DMA, forwarding operations, etc. until a target amount of data is processed. Delimiter based execution together with the forwarding operations and the carryover operations may keep host data units together in one buffer despite how the host data units are split across storage sources. Accordingly, the process 900 may provide a technique for parallel processing in a system in which host data units are not aligned with a parallel processing pipeline.

Figure 10:
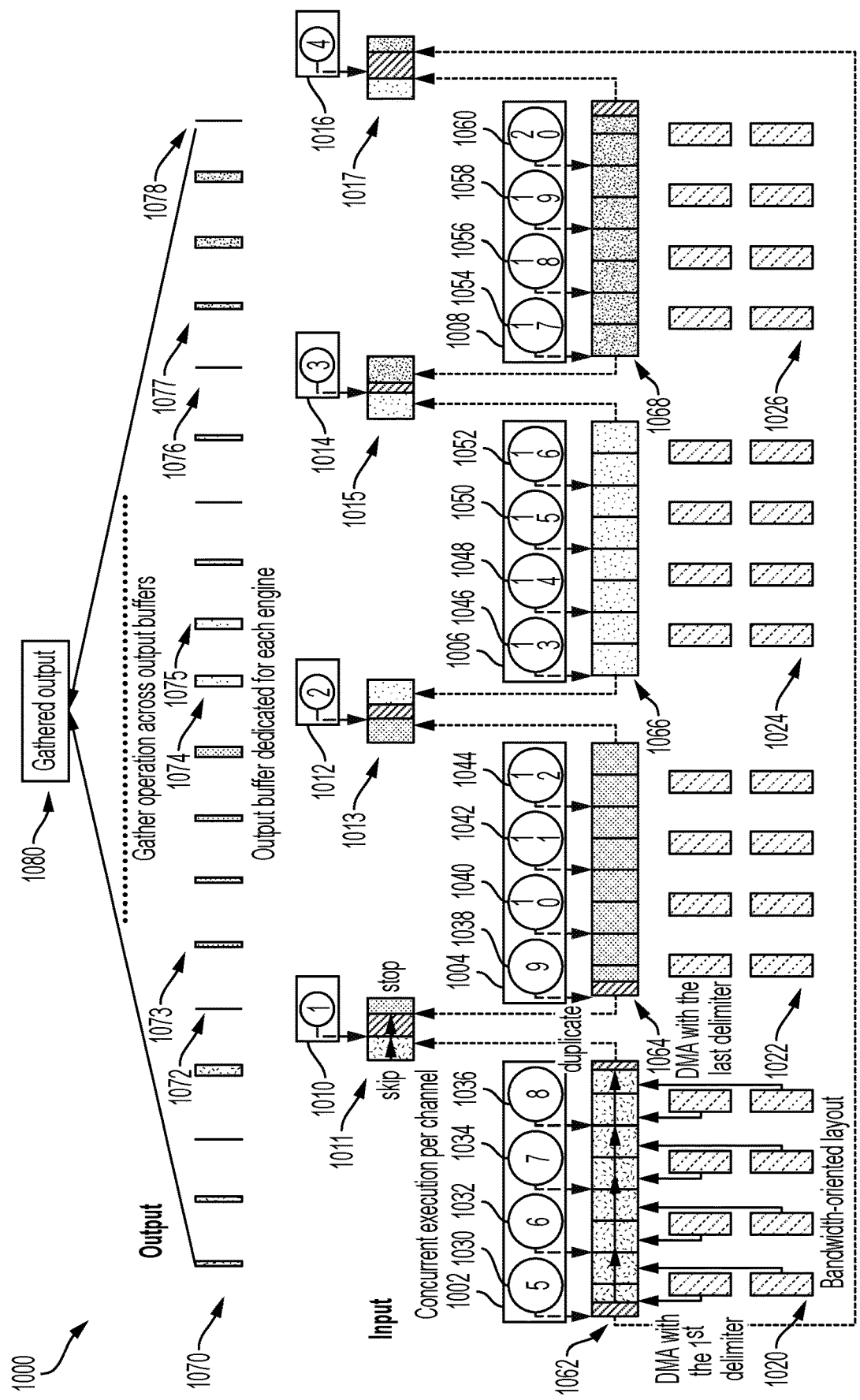
FIG. 10 is a diagram illustrating an example of a device performing delimiter based parallel computations in which compute modules operating in parallel pass data to one or more downstream processors based on delimiters.

FIG. 10 is a diagram illustrating an example of a device 1000 performing delimiter based parallel computations in which compute modules operating in parallel pass data to one or more downstream processors based on delimiters. The device 1000 may correspond to the device 500 or to the system 100.

The device 1000 includes a first input buffer 1062, a second input buffer 1064, a third input buffer 1066, and a fourth input buffer 1068. A first processor 1002 is associated with the first input buffer 1062, a second processor 1004 is associated with the second input buffer 1064, a third processor 1006 is associated with the third input buffer 1066, and a fourth processor 1008 is associated with the fourth input buffer 1068. The first processor 1002 is associated with a first output buffer 1070, the second processor 1004 is associated with a second output buffer 1073, the third processor 1006, is associated with a third output buffer 1075, and the fourth processor 1008 is associated with a fourth output buffer 1077.

The device 1000 further includes a first downstream input buffer 1011 associated with a first downstream processor 1010. The first downstream processor 1010 is further associated with a first downstream output buffer 1072. The device 1000 further includes a second downstream input buffer 1013 associated with a second downstream processor 1012. The second downstream processor 1012 is further associated with a second downstream output buffer 1074. The device 1000 further includes a third downstream input buffer 1015 associated with a third downstream processor 1014. The third downstream processor 1014 is further associated with a third downstream output buffer 1076. The device 1000 further includes fourth downstream input buffer 1017 associated with a fourth downstream processor 1016. The fourth downstream processor 1016 is further associated with a fourth downstream output buffer 1078.

The first processor 1002, first input buffer 1062, and the first output buffer 1070 may correspond to a compute module, such as the compute module 600. Similarly other combinations of associated processor, input buffer, and output buffer included in the device 1000 may correspond to compute modules, such as the compute module 600.

The downstream processors 1010, 1012, 1014, 1016 are arranged downstream (e.g., closer to an output stage of a processing pipeline) from the processors 1002, 1004, 1006, 1008. In some examples, the first input buffer 1062, the first processor 1002, and the first output buffer 1070 correspond to the first channel compute module 518; the second input buffer 1064, the second processor 1004, and the second output buffer 1073 correspond to the second channel compute module 520; the third input buffer 1066, the third processor 1006, and the third output buffer 1075 correspond to the third channel compute module 526; and the fourth input buffer 1068, the fourth processor 1008, and the fourth output buffer 1077 correspond to the fourth channel compute module 528. The first downstream input buffer 1011, the first downstream processor 1010, and the first downstream output buffer 1072 may correspond to a downstream compute module, such as the storage device compute module 508. Similarly, the second downstream input buffer 1013, the second downstream processor 1012, and the second downstream output buffer 1074 may correspond to the storage device compute module 508 (e.g., a device may have more than one storage device compute module). Further, the third downstream input buffer 1015, the third downstream processor 1014, and the third downstream output buffer 1076 may correspond to the storage device compute module 508. Further, the fourth downstream input buffer 1017, the fourth downstream processor 1016, and the fourth downstream output buffer 1078 may correspond to the storage device compute module 508.

The device 1000 further includes a first storage source 1020, a second storage source 1022, a third storage source 1024, a fourth storage source 1026. The storage sources 1020, 1022, 1024, 1026 may include storage media, storage media channels, storage media channel groups, etc. In some implementations, the first storage source 1020 corresponds to the first channel 534, the second storage source 1022 corresponds to the second channel 536, the third storage source 1024 corresponds to the third channel 538, and the fourth storage source 1026 corresponds to the fourth channel 540.

The device 1000 further includes a gathered output buffer 1080. The gathered output buffer 1080 may correspond to an output buffer of a compute module downstream from the processors illustrated.

In operation, the first input buffer 1062 receives data from the first storage source 1020. The data may be placed in the first input buffer 1062 by a DMA operation performed by the first processor 1002. The first processor 1002 may identify first and last delimiters within the data during the DMA operation. Similarly, the second input buffer 1064 receives data from the second storage source 1022. The data may be placed in the second input buffer 1064 by a DMA operation performed by the second processor 1004. The second processor 1004 may identify first and last delimiters within the data during the DMA operation. Further, the third input buffer 1066 receives data from the third storage source 1024. The data may be placed in the third input buffer 1066 by a DMA operation performed by the third processor 1006. The third processor 1006 may identify first and last delimiters within the data during the DMA operation. Further, the fourth input buffer 1068 receives data from the fourth storage source 1026. The data may be placed in the fourth input buffer 1068 by a DMA operation performed by the fourth processor 1008. The fourth processor 1008 may identify first and last delimiters within the data during the DMA operation.

The first processor 1002 sends data before a first delimiter in the first input buffer 1062 to the fourth downstream input buffer 1017. Further, the processor 1002 sends data after a last delimiter in the first input buffer 1062 to the first downstream input buffer 1011. The second processor 1004 sends data before a first delimiter in the second input buffer 1064 to the first downstream input buffer 1011. Accordingly, a host data unit split across the first input buffer 1062 and the second input buffer 1064 is put back together in the first downstream input buffer 1011. The second processor 1012 further sends data occurring after a last delimiter in the second input buffer 1064 to the second downstream input buffer 1013. The third processor 1006 sends data occurring before a first delimiter in the third input buffer 1066 to the second downstream input buffer 1013. Accordingly, a host data unit split across the second input buffer 1064 and the third input buffer 1066 is put back together in the second input buffer 1013. The third processor 1006 sends data occurring after a last delimiter in the third input buffer 1066 to the third downstream input buffer 1015. The fourth processor 1008 sends data occurring before a first delimiter in the fourth input buffer 1068 to the third downstream input buffer 1015. Accordingly, a host data unit split across the third input buffer 1066 and the fourth input buffer 1068 is put back together in the third downstream input buffer 1015. The fourth processor 1008 sends data occurring after a last delimiter in the fourth input buffer 1068 to the fourth downstream input buffer 1017. Accordingly, a host data unit split across the fourth input buffer 1068 and the first input buffer 1062 is put back together in the fourth downstream input buffer 1017.

Each of the processors 1002, 1004, 1006, 1008 in the device 1000 includes four kernels. Further each of the downstream processors 1010, 1012, 1016 includes a kernel. A different number of kernels may be included than shown. Each kernel may include hardware and/or executable software configured to perform a computation on data (e.g., a search function, a filter function, a mathematical operation, etc.) to generate output. The first processor 1002 includes a first kernel 1030, a second kernel 1032, a third kernel 1034, and a fourth kernel 1036. The second processor 1004 includes a fifth kernel 1038, a sixth kernel 1040, a seventh kernel 1042, and an eighth kernel 1044. The third processor 1006 includes a ninth kernel 1046, a tenth kernel 1048, an eleventh kernel 1050, and a twelfth kernel 1052. The fourth processor 1008 includes a thirteenth kernel 1054, a fourteenth kernel 1056, a fifteenth kernel 1058, and a sixteenth kernel 1060. Each of the kernels 1030, 1032, 1034, 1036, 1038, 1040, 1042, 1044, 1046, 1048, 1050, 1052, 1054, 1056, 1058, 1060 may perform computations in parallel to generate output.

The first downstream processor 1010 includes a first downstream kernel 1082, the second downstream processor 1012 includes a second downstream kernel 1084, the third downstream processor 1014 includes a third downstream kernel 1086, and the fourth processor 1016 includes a fourth downstream kernel 1088. Each of the downstream kernels 1082, 1084, 1086, 1088 may operate in parallel to generate output. In some examples, the kernels 1030, 1032, 1034, 1038, 1040, 1042, 1044, 1046, 1048, 1050, 1052, 1054, 1056, 1058, 1060 may operate in parallel with the downstream kernels 1082, 1084, 1086, 1088.

The kernels 1030, 1032, 1034, 1036, 1038, 1040, 1042, 1044, 1046, 1048, 1050, 1052, 1054, 1056, 1058, 1060 and the downstream kernels 1082, 1084, 1086, 1088 may be set to perform computations based on delimiter locations. For example, the kernels 1030, 1032, 1034, 1036, 1038, 1040, 1042, 1044, 1046, 1048, 1050, 1052, 1054, 1056, 1058, 1060 may begin computations at data immediately following a delimiter. The downstream kernels 1082, 1084, 1086, 1088 may operate in a similar fashion. Fewer than all of the kernels 1030, 1032, 1034, 1036, 1038, 1040, 1042, 1044, 1046, 1048, 1050, 1052, 1054, 1056, 1058, 1060 may be used in some examples.

Output of computations performed by the first processor 1002 is placed into the first output buffer 1070. Output of computations performed by the second processor 1004 is placed into the second output buffer 1073. Output of computations performed by the third processor 1006 is placed into the third output buffer 1075. Output of computations performed by the fourth processor 1008 is placed into the fourth output buffer 1077. Output from the first downstream processor 1010 is placed into the first downstream output buffer 1072. Output from the second downstream processor 1012 is placed into the second downstream output buffer 1074. Output from the third downstream processor 1014 is placed into the third downstream output buffer 1076. Output from the fourth downstream processor 1016 into the fourth downstream output buffer 1078.

Outputs in the output buffers 1070, 1073, 1075, 1077 and the downstream output buffers 1072, 1074, 1076, 1078 is gathered into the gathered output buffer 1080 (e.g., by a downstream processor, such as a processor in the storage device compute module 508) for output and/or additional processing.

Because incomplete host data units located at ends of input buffers are put back together in downstream input buffers based on delimiter locations, the device 1000 provides efficient parallel processing of host data that is stored in a fashion that is unaligned with a parallel processing pipeline.

Figure 11:
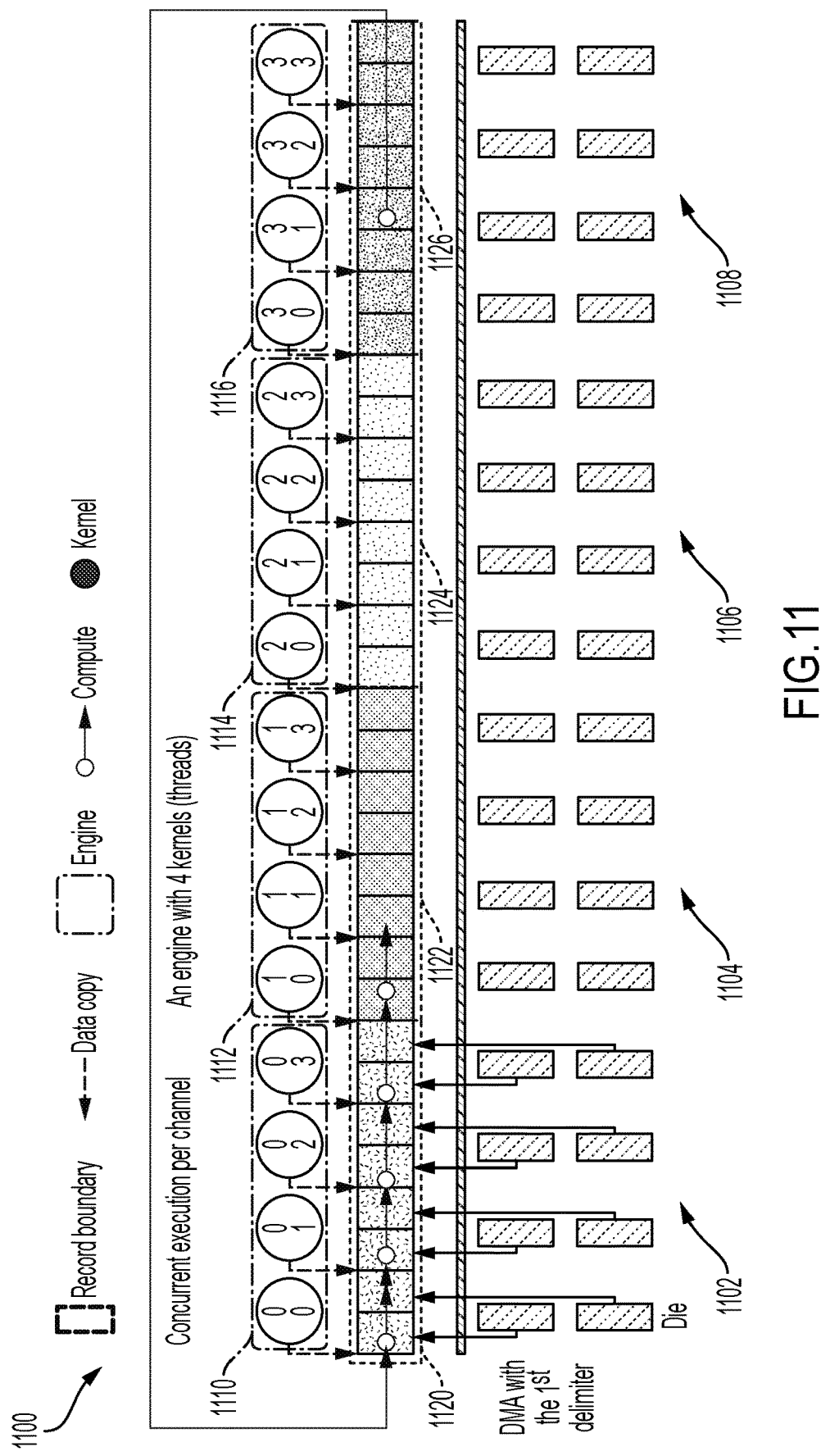
FIG. 11 is a diagram illustrating an example of a device performing delimiter based parallel computations in which compute modules operating in parallel directly access input buffers of other compute modules based on delimiter locations.

FIG. 11 is a diagram illustrating an example of a device 1100 performing delimiter based parallel computations in which compute modules operating in parallel directly access input buffers of other compute modules based on delimiter locations. The device 1100 is a computational storage device and may correspond to the device 500 of FIG. 5. The device 1100 includes a first processor 1110 associated with a first input buffer 1120, a second processor 1112 associated with a second input buffer 1122, a third processor 1114 associated with a third input buffer 1124, and a fourth processor 1116 associated with a fourth input buffer 1126. In some examples, the first processor 1110 and the first input buffer 1120 correspond to the first channel compute module 518, the second processor 1112 and the second input buffer 1122 correspond to the second channel compute module 520, the third processor 1114 and the third input buffer 1124 correspond to the third channel compute module 526, and the fourth processor 1116 and the fourth input buffer 1126 correspond to the fourth channel compute module 528. In other examples, the processors 1110, 1112, 1114, 1116 and input buffers 1120, 1122, 1124, 1126 correspond to different compute modules in the device 500.

In the device 1100, the input buffers 1120, 1122, 1124, 1126 are ranges within a common buffer space. Data from a first storage source 1102 is copied to the first input buffer 1120 (e.g., by a DMA operation initiated by the first processor 1110). Data from a second storage source 1104 is copied to the second input buffer 1122 from a second storage source, data from a third storage source 1106 is copied to a third input buffer 1124, and data from a fourth storage source 1108 is copied into the fourth input buffer 1126. The first processor 1110 identifies first and last delimiter locations within the first input buffer 1120, the second processor 1112 identifies first and last delimiter locations within the second input buffer 1122, the third processor 1114 identifies first and last delimiter locations within the third input buffer 1124, and the fourth processor 1116 identifies first and last delimiter locations within the fourth input buffer 1126.

In operation, the first processor 1110 begins processing on data after a first delimiter in the first input buffer 1120 and continues processing into the second input buffer 1122 until a first delimiter in the second input buffer 1122 is reached. Similarly, the second processor 1112 begins processing data occurring after the first delimiter in the second input buffer 1122 and continues processing into the third input buffer 1124 until a first delimiter in the third input buffer is reached. Similarly, the third processor 1114 begins processing data occurring after the first delimiter in the third input buffer 1124 and continues processing until reaching a first delimiter in the fourth input buffer 1126. Similarly, the fourth input buffer 1126 beings processing data occurring after the first delimiter in the fourth input buffer and upon reaching an end of the fourth input buffer 1126, begins processing at a beginning of the first input buffer 1120 and continues until reaching a first delimiter in the first input buffer 1120.

The processors 1110, 1112, 1114, 1116 may operate in parallel. Further, because the processors may read past boundaries of their associated input buffers, a host data unit may be processed by a single processor rather than being split across processors. Accordingly, the device 1100 may provide parallel processing of data in systems in which host data units are not aligned with a parallel processing pipeline. It should be noted that input buffers of the device 1100 may not include extra buffer space as in some other implementations described herein.

Figure 12:
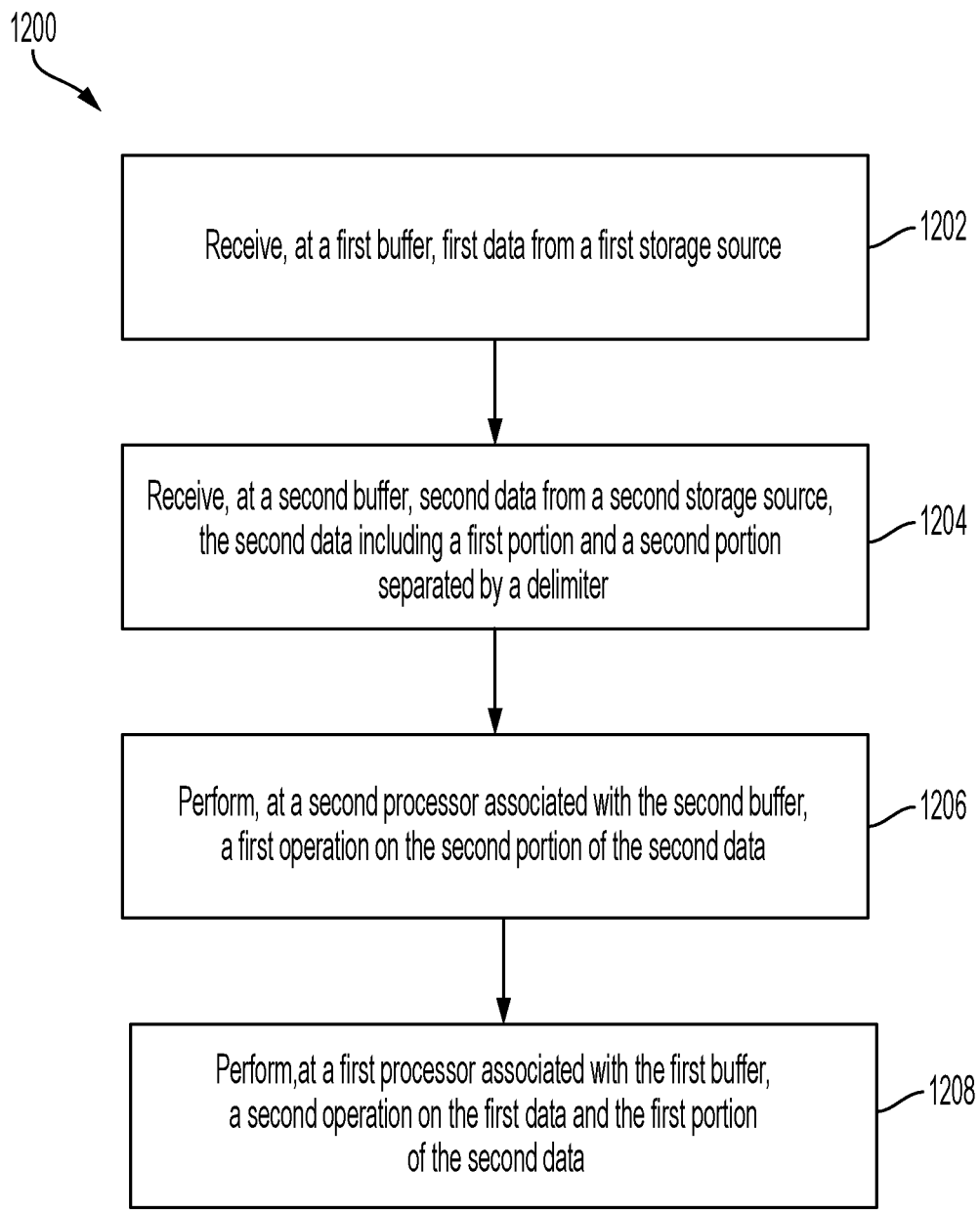
FIG. 12 is a flowchart of a method for delimiter based parallel processing.

FIG. 12 is a flowchart of a method 1200 for delimiter based parallel processing. The method 1200 may be performed by the system 100, by the device 500, by the device 700, by the device 1000, or by the device 1100.

The method 1200 includes receiving, at a first buffer, first data from a first storage source, at 1202. For example, the system first buffer 106 may receive the first data, including the first delimiter 113 and the first portion 114, from the first storage source 110. As another example, the first buffer 106 may receive the first data from the first storage source 110 via the third processor 302 and the third buffer 304. As another example, the first input buffer 710 may receive data from the first storage source 702. As another example, the first downstream input buffer 1011 may receive data from the first storage source 1020 via the first input buffer 1062 and the first processor 1002. As another example, the first input buffer 1120 may receive data from the first storage source 1102.

The method 1200 further includes receiving, at a second buffer, second data from a second storage source, the second data including a first portion and a second portion separated by a delimiter, at 1204. For example, the second buffer 108 may receive the second data, including the second portion 116, the second delimiter 118, and the third delimiter 121, from the second storage source 112. As another example, the second input buffer 712 may receive data from the second storage source 704. As another example, the second input buffer 1064 may receive data from the second storage source 1022. As another example, the second input buffer 1122 may receive data from the second storage source 1104.

The method 1200 further includes performing, at a second processor associated with the second buffer, a first operation on the second portion of the second data, at 1206. For example, the second processor 104 may perform a computation on the third portion 120 in response to the third portion falling between a first and last delimiter in the second buffer 108 (e.g., the second delimiter 118 and the third delimiter 121). As another example, the second processor 720 may perform computations on data in the second input buffer 712 that falls between a first and last delimiter within the second input buffer. As another example, the second processor 1004 may perform computations based on data in the second input buffer 1064 between a first and last delimiter within the second input buffer 1064. As another example, the second processor 1112 may perform computations based on data in the second input buffer 1122 falling between a first and last delimiter within the second input buffer 1122.

The method 1200 further includes performing, at a first processor associated with the first buffer, a second operation on the first data and the first portion of the second data, at 1208. For example, the second processor 104 may copy the second portion 116 into the first buffer 106 in response to the second portion 116 being located before a first delimiter (e.g., the second delimiter 118) in the second buffer 108. The first processor 102 may perform computations based on the first portion 114 and the second portion 116. As another example, the first processor 102 may perform computations beginning after a first delimiter in the first buffer 106 (e.g., the first delimiter 113) and continuing into the second buffer 108 until reaching a first delimiter within the second buffer 108 (e.g., the second delimiter 118). As another example, the second processor 720 may copy data located before a first delimiter in the second input buffer 712 into the first input buffer 710 and the first processor 718 may perform computations based on data in the first input buffer 710. In another example, the second processor 1004 copies data before a first delimiter in the second buffer 1064 to the first downstream input buffer 1011 and the first downstream processor 1010 performs computations based on data in the first downstream input buffer 1011. In another example, the first processor 1110 performs computations on data starting after a first delimiter in the first input buffer 1120 and continues into the second input buffer 1122 until reaching a first delimiter within the second input buffer 1122.

The method 1200 may be used to perform parallel processing in systems in which host data units are not aligned with storage data units and/or a parallel processing pipeline.

In some examples, X corresponds to Y based on X matching Y. For example, a first ID may be determined to correspond to a second ID that matches (e.g., has a same value as) the first ID. In other examples, X correspond to Y based on X being associated with (e.g., linked to) Y. For example, X may be associated to Y by a mapping data structure.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an radio frequency identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. Elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A storage device comprising:
    a first storage source storing first data;
    a second storage source storing second data, the second data including a first portion and a second portion separated by a delimiter;
    a first buffer configured to receive the first data;
    a second buffer configured to receive the second data and store the first portion, the second portion, and the delimiter;
    a first processor associated with the first buffer; and
    a second processor associated with the second buffer, wherein the second processor is configured to perform a first operation on the second portion of the second data,
    wherein the first processor is configured to:
        receive a request from a third processor of a host computing device to perform a computation on a data unit, the third processor being different from the first processor and the second processor;
        identify, based on the request and further based on the delimiter, the first data and the first portion of the second data as comprising the data unit;
        perform a second operation on the first data and the first portion of the second data based on the delimiter and generate an output, wherein the second operation includes a first computation based on the first data and a second computation based on the first portion of the second data, wherein the first processor is configured to access the first portion of the second data for performing the second operation based on a location of the delimiter; and return the output to the third processor in response to the request.

2. The storage device of claim 1, wherein the second processor is configured to copy the first portion of the second data from the second buffer to the first buffer.

3. The storage device of claim 1, wherein the delimiter corresponds to a first delimiter in the second buffer, and wherein the second processor is configured to copy the first portion of the second data to the first buffer in response to the first portion being located before the first delimiter within the second buffer.

4. The storage device of claim 3, wherein the first buffer includes a first extra buffer space in front of the first data in the first buffer and a second extra buffer space following the first data in the first buffer, and wherein the second processor is configured to copy the first portion to the second extra buffer space.

5. The storage device of claim 4, further comprising:
a third buffer storing third data; and
a third processor associated with the third buffer, wherein the third processor is configured to copy the third data to the first extra buffer space in response to the third data being located after a final delimiter in the third buffer.

6. The storage device of claim 3, wherein the first data follows a final delimiter in the first buffer, and wherein the first processor is configured to perform the second operation in response to the first buffer receiving the first portion of the second data.

7. The storage device of claim 1, wherein the storage device includes a buffer space that includes the first buffer and the second buffer, and wherein the first processor is configured to stop processing in the second buffer based on a location of the delimiter, and wherein the second processor is configured to begin processing in the second buffer based on the location of the delimiter.

8. The storage device of claim 1, wherein the first storage source comprises a storage channel, a storage media device, or a group of storage channels.

9. The storage device of claim 1, wherein the first storage source comprises a NAND flash channel, a NAND flash chip, or a group of NAND flash channels.

10. The storage device of claim 1, further comprising:
a third buffer configured to receive the first data from the first storage source; and
a third processor associated with the third buffer configured to copy the first data from the third buffer to the first buffer in response to the first data being located after a final delimiter in the third buffer.

11. A method comprising:
receiving, at a first buffer, first data from a first storage source;
receiving, at a second buffer, second data from a second storage source, the second data including a first portion and a second portion separated by a delimiter;
storing the first portion, the second portion, and the delimiter in the second buffer;
performing, at a second processor associated with the second buffer, a first operation on the second portion of the second data;
receiving, by a first processor associated with the first buffer, a request from a third processor of a host computing device to perform a computation on a data unit, the third processor being different from the first processor and the second processor;
identifying, by the first processor, based on the request and further based on the delimiter, the first data and the first portion of the second data as comprising the data unit;
performing, by the first processor, a second operation on the first data and the first portion of the second data based on the delimiter and generating an output, wherein the second operation includes a first computation based on the first data and a second computation based on the first portion of the second data, wherein the first processor is configured to access the first portion of the second data for performing the second operation based on a location of the delimiter; and
returning the output to the third processor in response to the request.

12. The method of claim 11, further comprising copying the first portion of the second data from the second buffer to the first buffer.

13. The method of claim 11, wherein the delimiter corresponds to a first delimiter in the second buffer, the method further comprising copying the first portion of the second data to the first buffer in response to the first portion being located before the first delimiter within the second buffer.

14. The method of claim 13, wherein the first buffer includes a first extra buffer space in front of the first data in the first buffer and a second extra buffer space following the first data in the first buffer, and wherein copying the first portion of the second data to the first buffer includes copying the first portion to the second extra buffer space.

15. The method of claim 14, further comprising:
storing third data in a third buffer associated with a third processor; and
copying the third data to the first extra buffer space in response to the third data being located after a final delimiter in the third buffer.

16. The method of claim 11, wherein the first buffer and the second buffer are included in a common buffer space, and wherein performing the second operation includes:
the first processor performing operations starting in the first buffer and stopping in the second buffer based on a location of the delimiter.

17. The method of claim 11, wherein the first storage source comprises a storage channel, a storage media device, or a group of storage channels.

18. The method of claim 11, wherein the first storage source comprises a NAND flash channel, a NAND flash chip, or a group of NAND flash channels.

19. The method of claim 11, further comprising:
receive the first data from the first storage source at a third buffer; and
copying the first data from the third buffer to the first buffer in response to the first data being located after a final delimiter in the third buffer.

20. A storage device comprising:
a first storage channel including a first media device storing first data;
a second storage channel including a second media device storing second data, the second data including a first portion and a second portion separated by a delimiter;
a first compute module associated with the first storage channel and including a first processor and a first input buffer; and a second compute module associated with the second storage channel and including a second processor and a second input buffer, wherein the second input buffer is configured to store the first portion, the second portion, and the delimiter, wherein the second processor is configured to perform a first operation on the second portion of the second data, wherein the first processor is configured to:
  receive a request from a third processor of a host computing device to perform a computation on a data unit, the third processor being different from the first processor and the second processor;
  identify, based on the request and further based on the delimiter, the first data and the first portion of the second data as comprising the data unit;
  perform a second operation on the first data and the first portion of the second data based on the delimiter and generate an output, wherein the second operation includes a first computation based on the first data and a second computation based on the first portion of the second data, wherein the first processor is configured to access the first portion of the second data for performing the second operation based on a location of the delimiter; and
  return the output to the third processor in response to the request.

* * * * *